INVENTORS.
EDWARD C. BULLARD
ARTHUR A. TOMENCEAK
JAMES E. ETTORRE

ATTORNEY

Aug. 2, 1960

E. C. BULLARD ET AL 2,947,188

SYNCHRONIZING DEVICE

Filed Jan. 31, 1955

*INVENTORS.*
EDWARD C. BULLARD
ARTHUR A. TOMENCEAK
JAMES E. ETTORRE

ATTORNEY

INVENTORS.
EDWARD C. BULLARD
ARTHUR A. TOMENCEAK
JAMES E. ETTORRE

ATTORNEY

INVENTORS.
EDWARD C. BULLARD
ARTHUR A. TOMENCEAK
JAMES E. ETTORRE

ATTORNEY

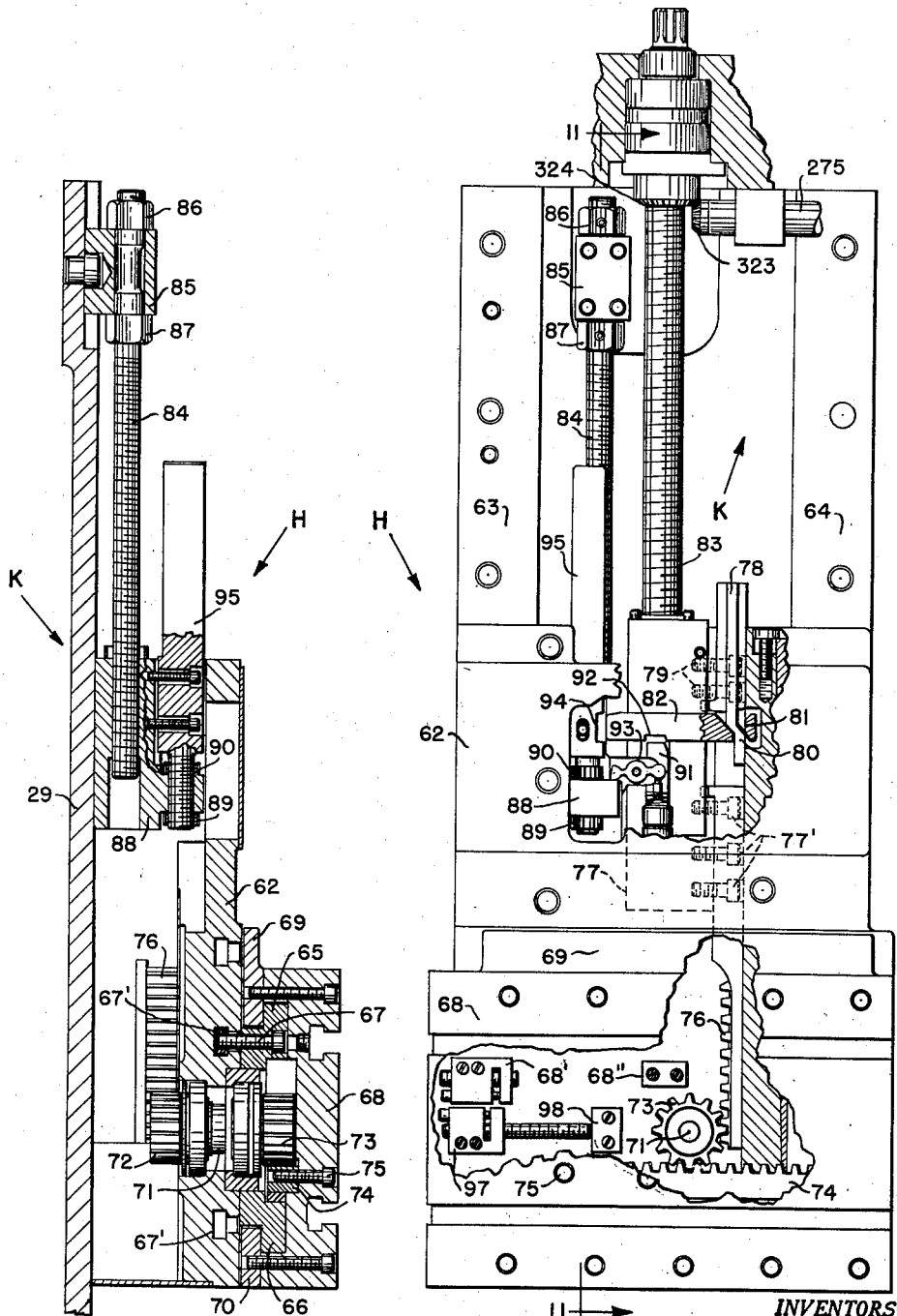

INVENTORS.
EDWARD C. BULLARD
ARTHUR A. TOMENCEAK
JAMES E. ETTORRE

ATTORNEY

INVENTORS.
EDWARD C. BULLARD
ARTHUR A. TOMENCEAK
JAMES E. ETTORRE

ATTORNEY

Aug. 2, 1960 E. C. BULLARD ET AL 2,947,188
SYNCHRONIZING DEVICE
Filed Jan. 31, 1955 14 Sheets-Sheet 12

INVENTORS.
EDWARD C. BULLARD
ARTHUR A. TOMENCEAK
JAMES E. ETTORRE

ATTORNEY

Aug. 2, 1960     E. C. BULLARD ET AL     2,947,188
SYNCHRONIZING DEVICE
Filed Jan. 31, 1955     14 Sheets-Sheet 13
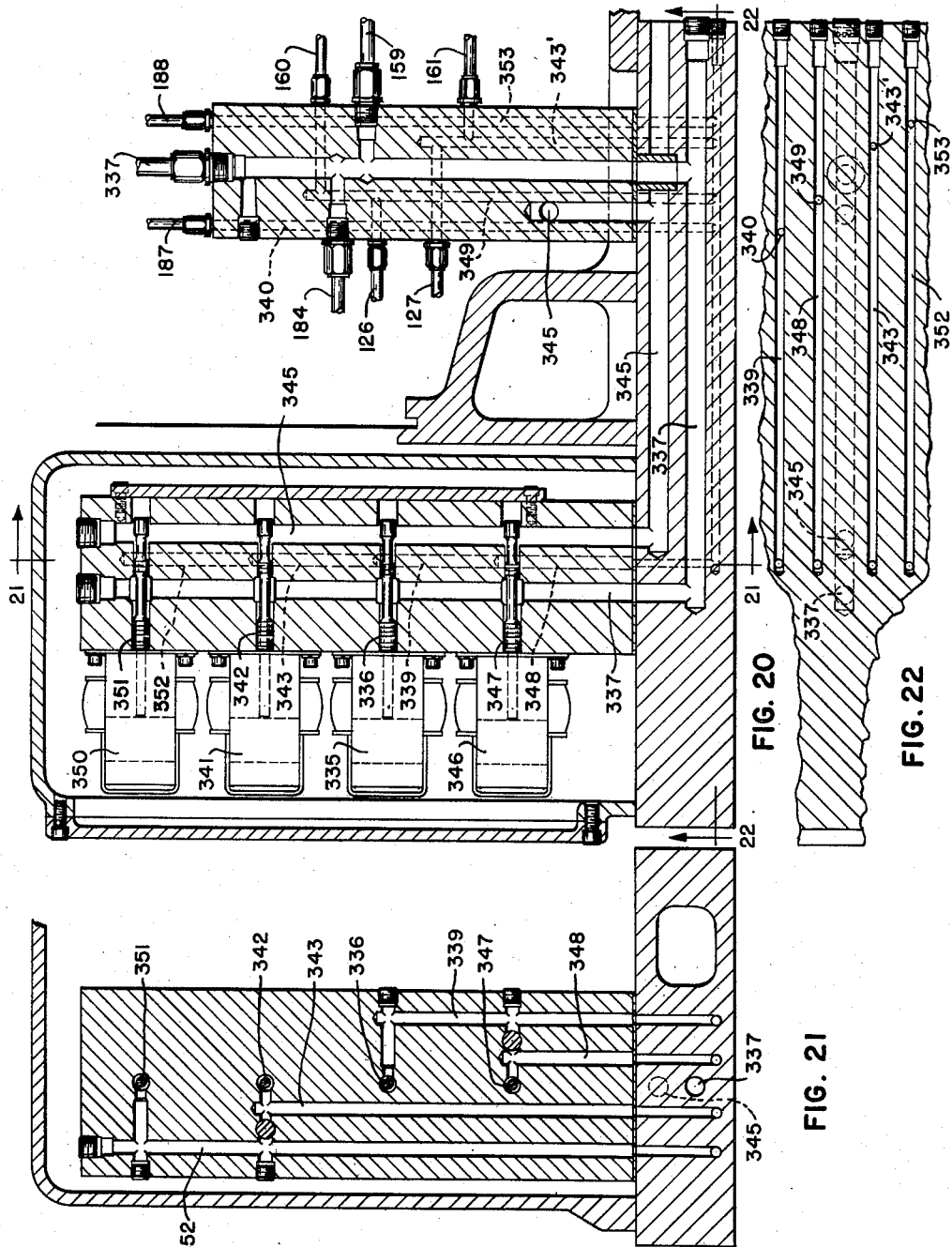
INVENTORS.
EDWARD C. BULLARD
ARTHUR A. TOMENCEAK
JAMES E. ETTORRE
ATTORNEY

United States Patent Office 2,947,188
Patented Aug. 2, 1960

2,947,188

SYNCHRONIZING DEVICE

Edward C. Bullard, Southport, and Arthur A. Tomenceak and James E. Ettorre, Bridgeport, Conn., assignors to The Bullard Company, a corporation of Connecticut Filed Jan. 31, 1955, Ser. No. 484,998

14 Claims. (Cl. 74—333)

The present invention relates to machine tools and particularly to a new and improved multiple spindle lathe of the vertical type.

Objects of the invention include the provision of a vertical multiple spindle lathe wherein the spindles are mounted on a carrier that is adapted to be indexed from station to station and in which the drive for the spindles in no way affects the accuracy with which the carrier can be maintained at each index position; the provision of such a lathe in which the spindle drive is transferred to the spindles through a stationary bracket in the base of the machine; the provision of such a lathe in which each spindle is synchronously rotated by an hydraulically-actuated synchronizing mechanism prior to the engagement of the spindle drive at each work station; the provision of such a lathe in which the operation of the hydraulic synchronizing mechanism is responsive to the indexing of the carrier that supports the spindles; the provision of such a vertical multiple spindle lathe in which the hydraulically-actuated synchronizing mechanism at the work stations, a brake at the loading station, and a carrier lock-pin mechanism are effectively controlled by valve means operated by a cam, the rotation of which cam is responsive to the indexing of the carrier; the provision of such a multiple spindle machine tool having a pull-gear means for timing the operation of valve-operating means to permit double indexing of the carrier; the provision of such a lathe in which the spindle synchronizing and driving mechanism employs a positive and impositive drive, both of which remain effective during a working operation to prevent backlash developing in the positive drive; the provision of such a multiple spindle machine tool in which an hydraulic chuck-operator for each spindle is provided with a controller that registers with an operating device at the loading station; the provision of such a multiple spindle lathe in which an hydraulic transfer means is provided between a stationary oil supply and the hydraulic chuck-operator of each spindle; the provision of such a multiple spindle lathe wherein a transfer means supplies a hydraulic medium to the hydraulic chuck operators during the working operation as well as while the carrier is being indexed from station to station; the provision of such a multiple spindle lathe in which a seal is provided as part of the transfer means and which is rendered effective only during the time when the carrier is at each of its index stations; the provision of such a multiple spindle lathe in which a feedworks is located at each of the work stations and embodies a coarse and fine feed drive; the provision of such a multiple spindle lathe having a feedworks embodying a coarse and fine feed, and in which clutches therein are rendered effective in response to the position of a corresponding tool head; the provision of such a multiple spindle lathe in which a control drum is driven by a multi-feed feedworks at each work station for rendering effective the coarse and fine feed drives thereof in a predetermined order; the provision of such a multiple spindle lathe in which the various clutches of the feedworks are hydraulically actuated by solenoid-controlled valves in a predetermined relation in response to the operation of a control drum; and the provision of such a multiple spindle lathe embodying in combination all of the previously described features.

The above, as well as other objects and novel features of the invention will become apparent from the following specification and the accompanying drawings in which:

Fig. 10 is a front elevational view looking in the direction of the arrows and along the line 10—10 of Fig. 1, certain parts being broken away to show others;

Fig. 11 is a sectional elevational view taken substantially along line 11—11 of Fig. 10;

Fig. 16 is a sectional elevational view taken substantially along line 16—16 of Fig. 14;

Fig. 20 is a sectional elevational view taken substantially along line 20—20 of Fig. 2, and showing a manifold for controlling the flow of fluid;

Fig. 21 is a sectional elevational view taken substantially along line 21—21 of Fig. 20;

Fig. 22 is a sectional view taken substantially along line 22—22 of Fig. 20;

Fig. 23 is a sectional plan view of a solenoid-operated valve shown in Fig. 14.

Figure 1:
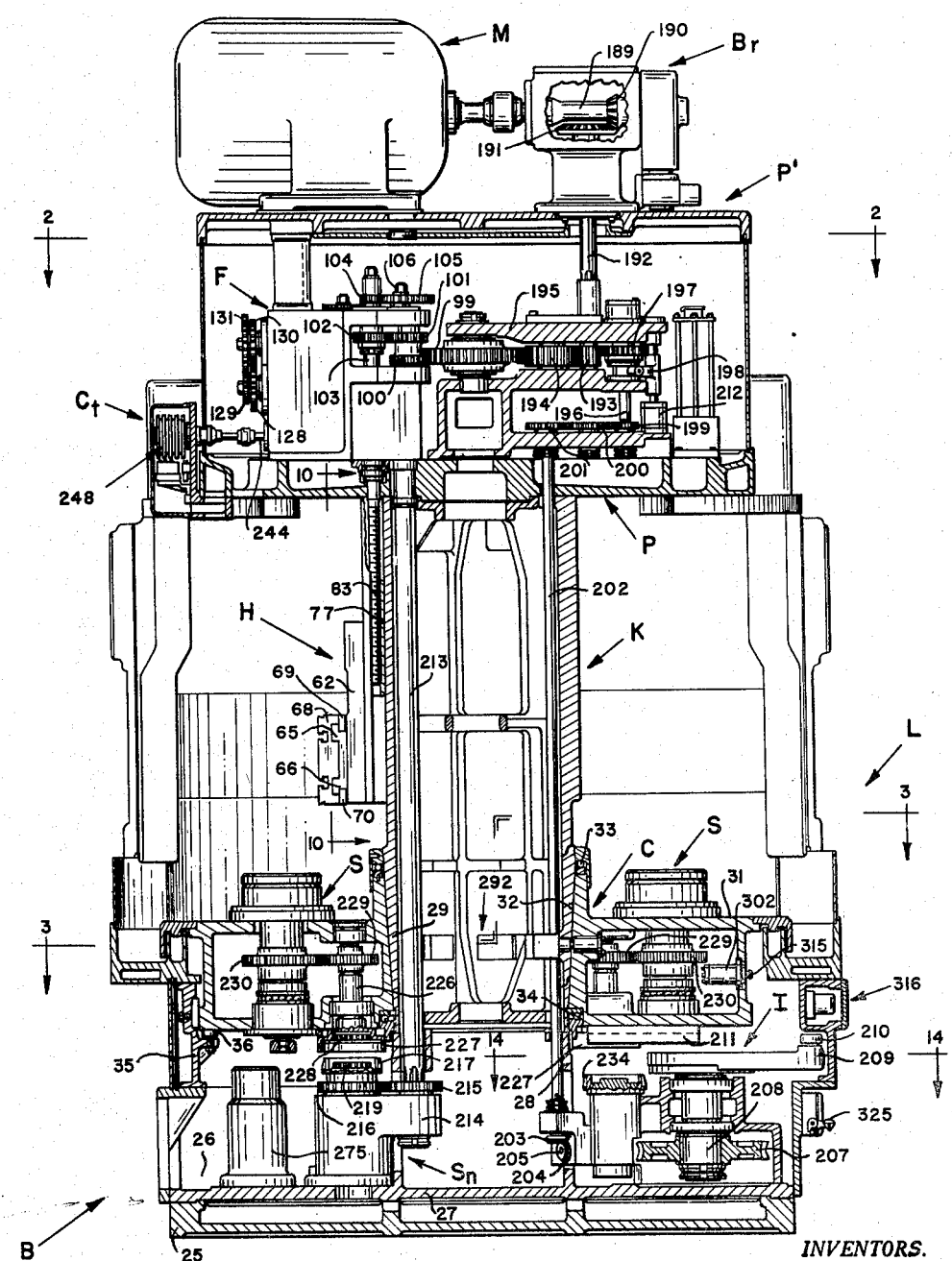
Figure 1 is a sectional elevational view of a multiple spindle machine tool to which the principles of the invention have been applied.

Referring to the drawings, and particularly to Fig. 1, a base B has fixed to it a centrally disposed upstanding column K. A rotatable carrier C is journaled on the lower end of the column K and supports a plurality of pairs of spindles S. In the present embodiment of the invention there are twelve such spindles S disposed in groups of two at equi-angularly related positions about the carrier C. The stationary column K is of hexagonal cross-section, thereby providing six stations about it. Tool supporting heads H are mounted in ways at five of the six stations about the column K, the sixth station L having no tool supporting head H since it is employed as the loading and unloading station. Operations are simultaneously performed on work on each of the spindles S at each of the five work stations about the column K. However, the work performed at each of the five stations may be the same as, or different from that at the other stations.

Figure 2:
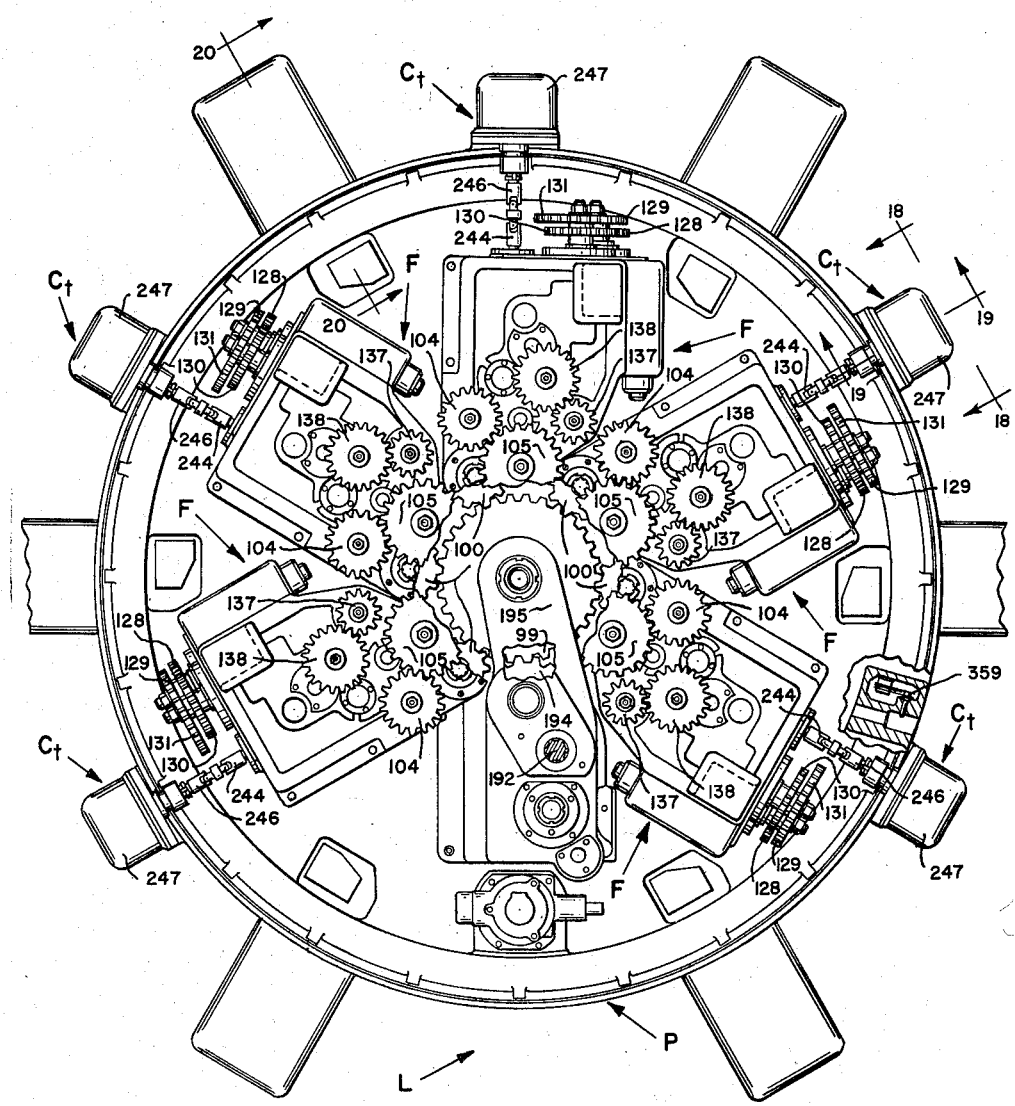
Fig. 2 is a sectional plan view taken substantially along line 2—2 of Fig. 1.

A platform P is rigidly attached to the top of the column K and it forms with an auxiliary platform P' a housing within which feedworks F are adapted to be located. Referring to Fig. 2, there is a feedworks transmission F at each of the stations about the column K excepting the loading station L. Mounted on top of the auxiliary platform P' is a motor M that supplies power through a gear bracket $B_r$ to the five feedworks F within the space between the platforms P and P'. Not only do the feedworks F control the movement of the heads H but they also control the rotation of the spindles S mounted in the carrier C.

When the operations have been performed at all of the work stations about the column K, the carrier C is adapted to be indexed to its next succeeding station so that additional operations may be performed on the work attached to the various spindles S, and so that finished work can be unloaded and replaced by rough work at the loading station L. Referring to Fig. 1, an indexing mechanism I is located within the base B of the machine tool and it is adapted to index the carrier C from station to station in a proper sequence with respect to the other operations of the machine. During the movement of the carrier C from one station to another, it is obvious that the drive to the spindles S must be disconnected at the old and re-connected at the new station. Accordingly, a synchronizing mechanism $S_n$ is also located within the base B of the machine and it is adapted to effect the correct rate of rotation of the spindles S prior to the positive engagement of the driving gears therefor.

In order to provide a flexible control that will govern the working operations performed by the head H, a control unit $C_t$ (Figs. 1 and 2) is located in cooperative position relatively to each of the feedworks F; and, likewise, a control $C_s$ (Fig. 14) is mounted on the outside of the base B for coordinating the actions of the indexing mechanism I and the synchronizing mechanism $S_n$ with the operations of the feedworks F as controlled by the control unit $C_t$.

Referring to Fig. 1, the base B comprises a sub-base structure 25 in the form of a flat, circular plate providing an oil reservoir for the machine tool. A main base portion 26 is mounted on the recessed plate 25 and it includes a platform 27 to which is integrally formed a centrally-disposed, upstanding, hollow, cylindrical wall member 28.

The column K comprises a tubular member having a hexagonal cross-section extending throughout a major portion of its length, and a conical portion 29 (Fig. 13) at its lower end. The column K rests on, and is bolted to the upstanding cylindrical wall 28 by bolts 30.

The carrier C comprises a generally circular hollow member 31 having an internally tapered surface 32 that mates with the conical surface 29 of the column K. The carrier C is provided with anti-friction thrust bearings 33 and 34 between it and the column K. Brackets 35 (Figs. 1 and 3) equally spaced about the base 26 are rigidly attached thereto. They are provided with adjustable pads 36 for supporting the outer peripheral portion of the carrier 31, thereby to provide a rigid structure that will resist deflection during the working operations being performed on work at the various spindles S about the carrier C.

Figure 3:
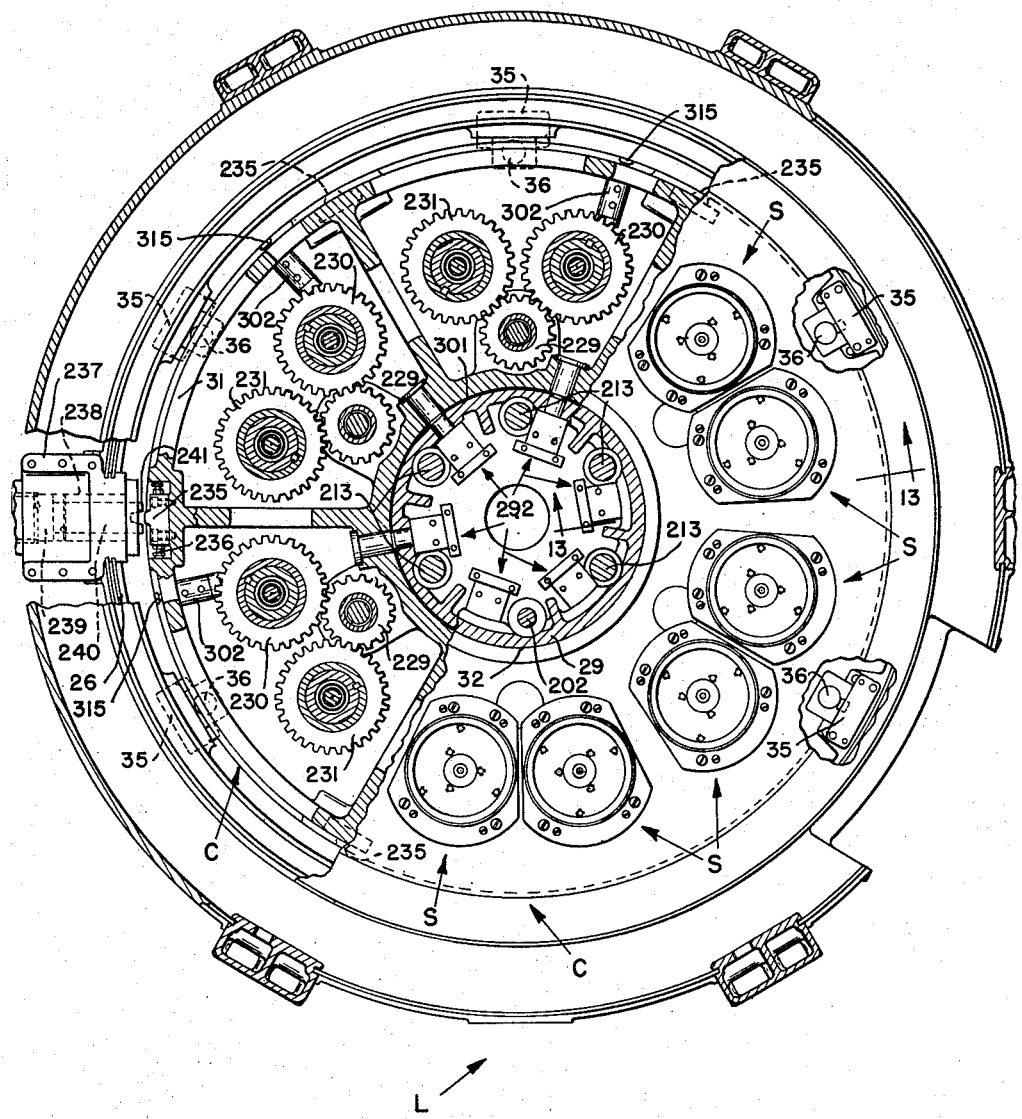
Fig. 3 is a sectional plan view taken substantially along line 3—3 of Fig. 1.
Figure 13:
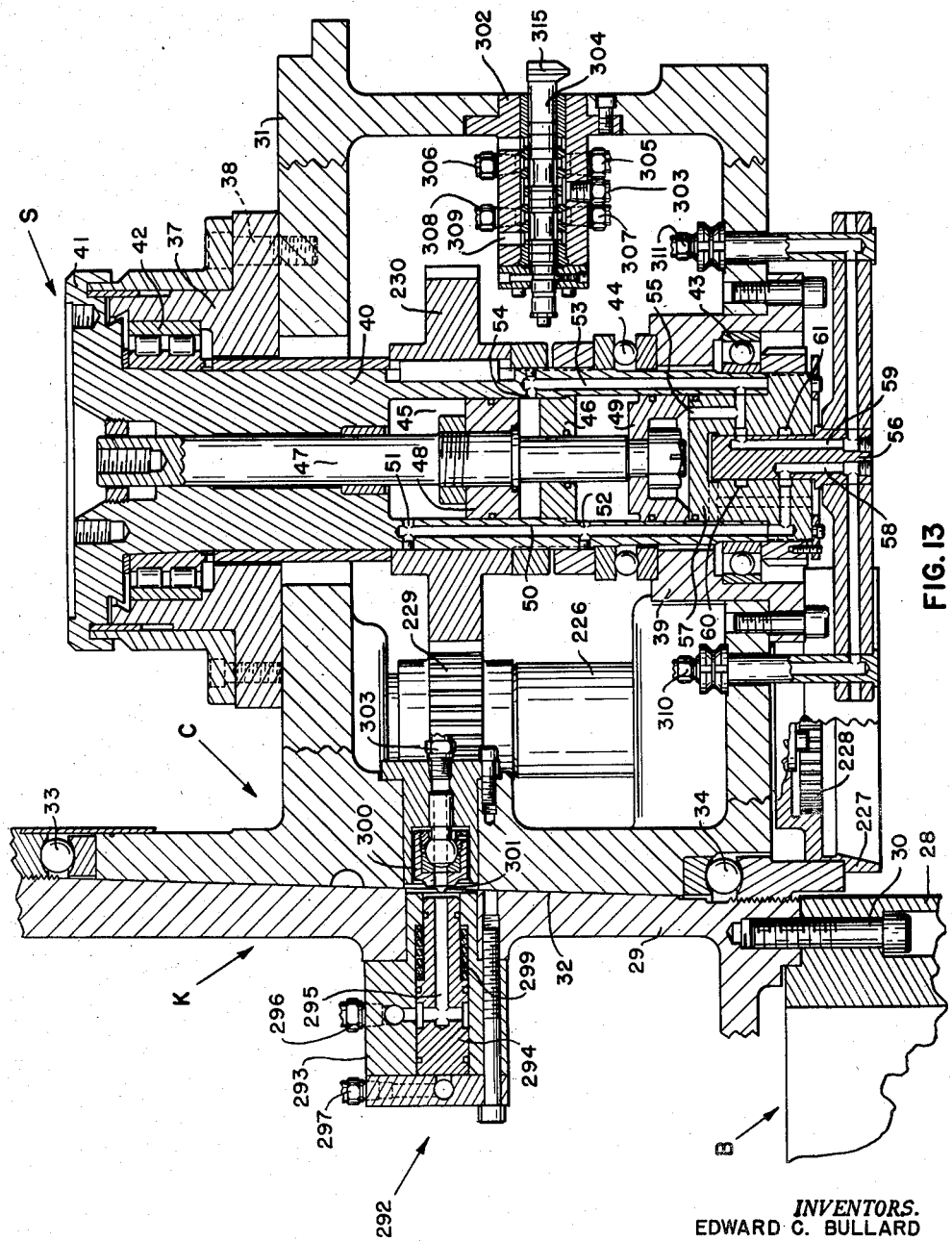
Fig. 13 is an enlarged sectional elevational view of the chuck operating mechanism taken substantially along line 13—13 of Fig. 3.

Referring to Figs. 3 and 13, six groups of two spindles each are located about the carrier C, one group of two spindles being adapted to be located adjacent each of the six sides of the hexagonal cross-sectioned column K. Since all of the spindles S are identical, only one will specifically be described.

Referring to Fig. 13, a combined bearing housing and seal 37 is rigidly fixed to the top of the carrier C by bolts 38. Another bearing housing 39 is rigidly fixed to the lower surface of the carrier C and both of these housings extend through aligned openings within the carrier C. Each spindle S includes a cylindrical member 40 having a top flange 41 adapted to receive the usual chucking mechanism (not shown) employed with such devices. The cylindrical member 40 is supported in the bearing housings 37 and 39 by radial thrust bearings 42 and 43, while a ball bearing 44 is employed to take the axial thrust.

The member 40 is provided with a cylinder 45 at its lower end. A partition 46 is rigidly fixed to the wall of the cylinder 45 midway of its length. A draw bar 47 passes through an opening within the upper portion of the member 40 and extends downwardly through the cylinder 45 and the partition 46. Upper and lower pistons 48 and 49 are fixed to the draw bar 47 and upon reciprocation of the assembly, the usual toggle links that connect the chuck jaws on the spindle S are adapted to be actuated. A hydraulic passage 50 is provided with ports 51 and 52 for admitting fluid under pressure to the top sides of the pistons 48 and 49. An additional passage 53 is provided with ports 54 and 55 which admit fluid under pressure to the bottom sides of the pistons 48 and 49, respectively. A non-rotatable manifold plug 56 extends into a closure element 57 for the bottom end of the cylinder 45. The manifold plug is provided with passages 58 and 59 that lead to the passages 50 and 53, respectively. Channels 60 and 61 are provided in the closure 57 for distributing the fluid under pressure to the passages 50 and 53 when the member 40 is rotating or stationary. Accordingly, admission of fluid under pressure to the passage 58 causes the draw bar 47 to move downwardly thereby effecting the closing of the chuck jaws associated with the spindle S; and, admission of fluid under pressure to the passage 59 causes the draw bar 47 to move upwardly thereby opening the chuck jaws on the spindle S.

Referring to Figs. 1, 10 and 11, each of the six faces of the column K, excepting that face at the loading station L, is provided with a head H adapted to support tools and to move them into cooperating position relative to work mounted on the various spindles S. Since each head is basically identical, only one will be described specifically. It comprises a saddle 62 that is adapted to be reciprocated vertically along ways 63 and 64 that are integral with one of the faces of the column K. The saddle 62 is itself provided with a pair of integral ways 65 and 66 (Fig. 11) arranged at right angles to the ways 63 and 64 and bolted to the saddle 62 by bolts 67 that cooperate with a circular T-slot 67' for a purpose to be described later. A tool post 68 is provided with a squarelock construction including elements 69 and 70 that cooperate with the ways 65 and 66 to facilitate movement of the tool post transversely to the vertical movement of the saddle 62. A stub shaft 71 is mounted in the saddle 62 and supports pinions 72 and 73 at opposite ends thereof (Fig. 11). The pinion 73 meshes with a rack 74 that is fixed to the tool post 68 by bolts 75. The pinion 72 (Fig. 11) meshes with a vertically-disposed rack 76 which latter is bolted to a nut 77 (Fig. 10) by bolts 77'. The nut 77 is non-rotatable and vertically-reciprocably associated with the back of the saddle 62. A cam 78 is likewise fixed to the nut 77 by screws 79. The cam 78 is provided with a portion 80 that extends through a cam slot 81 formed within a horizontally-reciprocable lock pin 82, the latter being slidably received within a slot formed in the back surface of the saddle 62. The sole downward driving connection between the nut 77 and the saddle 62 is the cooperation between the cam portion 80 and the lock pin 82.

The nut 77 is threaded to a screw 83 that is held against axial movement but adapted to be rotated in a forward or a reverse direction. In order to disconnect the saddle 62 from the nut 77, the lock pin 82 is adapted to be reciprocated horizontally, thereby to permit the portion 80 of the cam 78 to freely pass through the cam slot 81. Accordingly, an adjustable limiting mechanism is provided for this purpose, and it includes a threaded shaft 84 that is fixed to a bracket 85 by adjusting lock nuts 86 and 87. The bracket 85 is rigidly attached to the column K and, therefore, is immovable. The lower end of the threaded shaft 84 is provided with a stop plate 88 held adjustably between two lock nuts 89 and 90. Normally, the lock pin 82 is held in a rightward position (Fig. 10) by the cooperation of a spring pressed detent 91 and a recess 92 within the lower surface of the lock pin 82. The detent 91 is mounted on the saddle 62 as is a pivotally-mounted lever 93. As the screw 83 is rotated in one direction, the nut 77 is fed downwardly at a rate depending upon the rate of rotation of the screw. The cooperation between the portion 80 on cam 78 and the left-hand side of the cam slot 81 moves the saddle 62 together with the tool post 68 vertically downwardly. With the parts in the position shown in Fig. 10, the pivoted lever 93 is cooperating with the stop plate 88 thereby causing the detent 91 to be withdrawn from the slot 92. Accordingly, continued rotation of the screw 83 in a direction to cause the nut 77 and, consequently, the cam 78 to continue their downward movement, effects the passage of the portion 80 of the cam 78 through the cam slot 81 of the lock pin 82. This action forces the lever 82 leftwardly so that it cooperates with a recess 94 in the lower end of a locking element 95 forming part of the stop mechanism. Since the members 95 and 88 are pre-set and immovable, cooperation of the locking pin 82 with the recess 94 stops the vertically-downward movement of the saddle 62 and permits the continued downward movement of the nut 77 and the cam 78. Continued downward movement of the nut 77 causes the rack 76 to move downwardly, thereby rotating the pinion 73 in a clockwise direction (Fig. 10) and effecting the leftward motion of the rack 74 and, consequently, the leftward motion of the tool post 68. This leftward motion of the tool post 68 continues until abutting cooperation takes place between an adjustable stop 68' mounted on the saddle 62 and a fixed abutment 68" on the tool post 68. This construction provides a positive stop for the cross feed.

Reversing the rotation of the screw 83 effects the vertically-upward movement of the nut 77 and, consequently, the rotation of pinion 73 in a counter-clockwise direction, causing the rack 74 and the tool post 68 to move rightwardly until an adjustable stop 97 on the tool post 68 abuts against a positive stop 98 on the saddle 62. When such abutting relation occurs, the rack 74, pinion 73, pinion 72 and the rack 76 become locked so that further upward movement of the nut 77 causes the saddle 62 and the tool post 68 to move vertically upwardly. Simultaneously with the abutting cooperation between the stops 97 and 98, the right-hand side of the cam portion 80 of the cam 78 cooperates with the right-hand portion of the cam slot 81 in the lock pin 82, thereby retracting it from cooperation with the slot 94 in the locking mechanism. Accordingly, the pivoted lever 93 is moved away from the stop 88, thereby permitting the spring-pressed detent 91 to move into cooperating position with the slot 92 in the bottom surface of the locking pin 82. This action re-sets the mechanism for the next succeeding downward motion.

Should it be decided to move the tool post 68 rightwardly (Fig. 10) rather than leftwardly during the downward movement of the nut 77, provision is made through the bolts 67 and the circular T-slots 67' for swiveling the tool post 68 through 180° thereby locating the rack 74 on top of the pinion 73 rather than on the bottom as shown in Fig. 10. In such position, downward feed of the rack 76 after the nut 77 has been released from the saddle 62 causes the rightward movement of the tool post 68 (Fig. 10).

Figure 4:
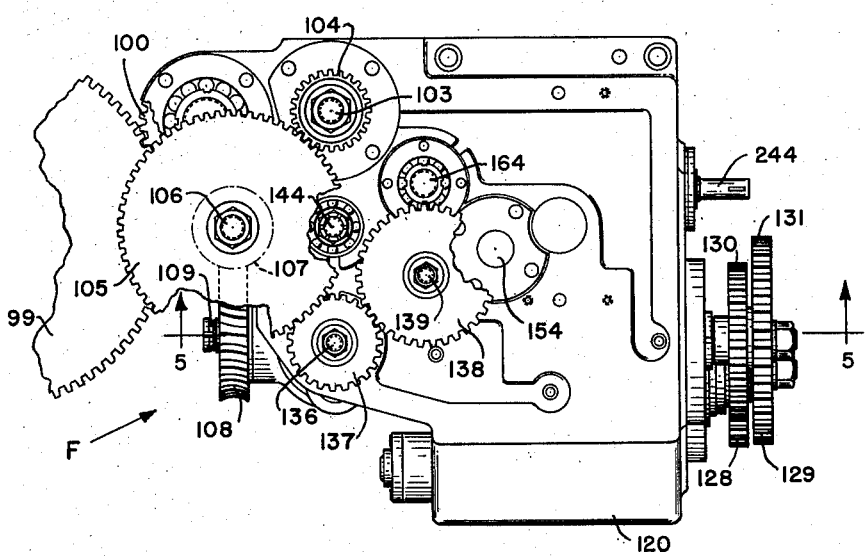
Fig. 4 is a plan view of one of the feedworks units of the machine as shown in Fig. 1 and as viewed on the right-hand side of Fig. 2.
Figure 5:
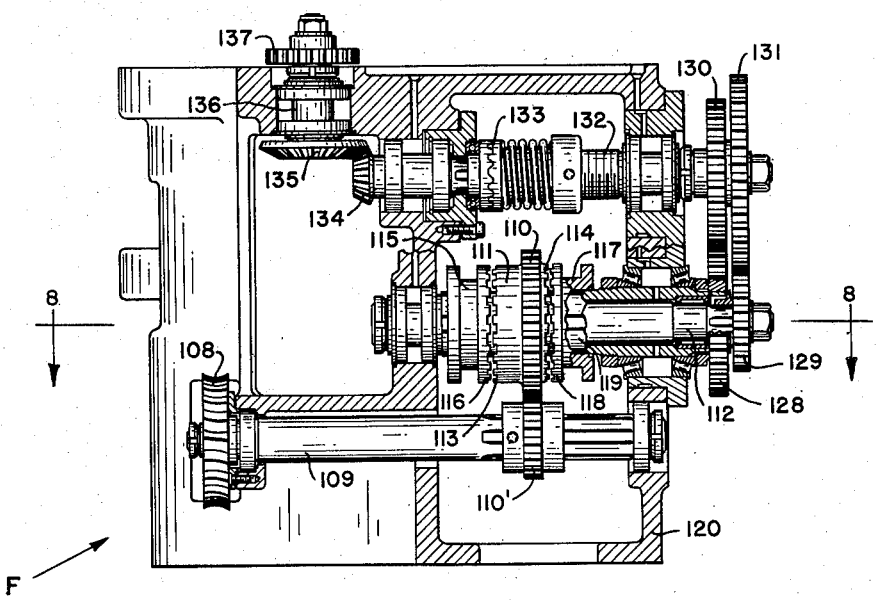
Fig. 5 is a sectional elevational view taken substantially along lines 5—5 of Fig. 4.
Figure 6:
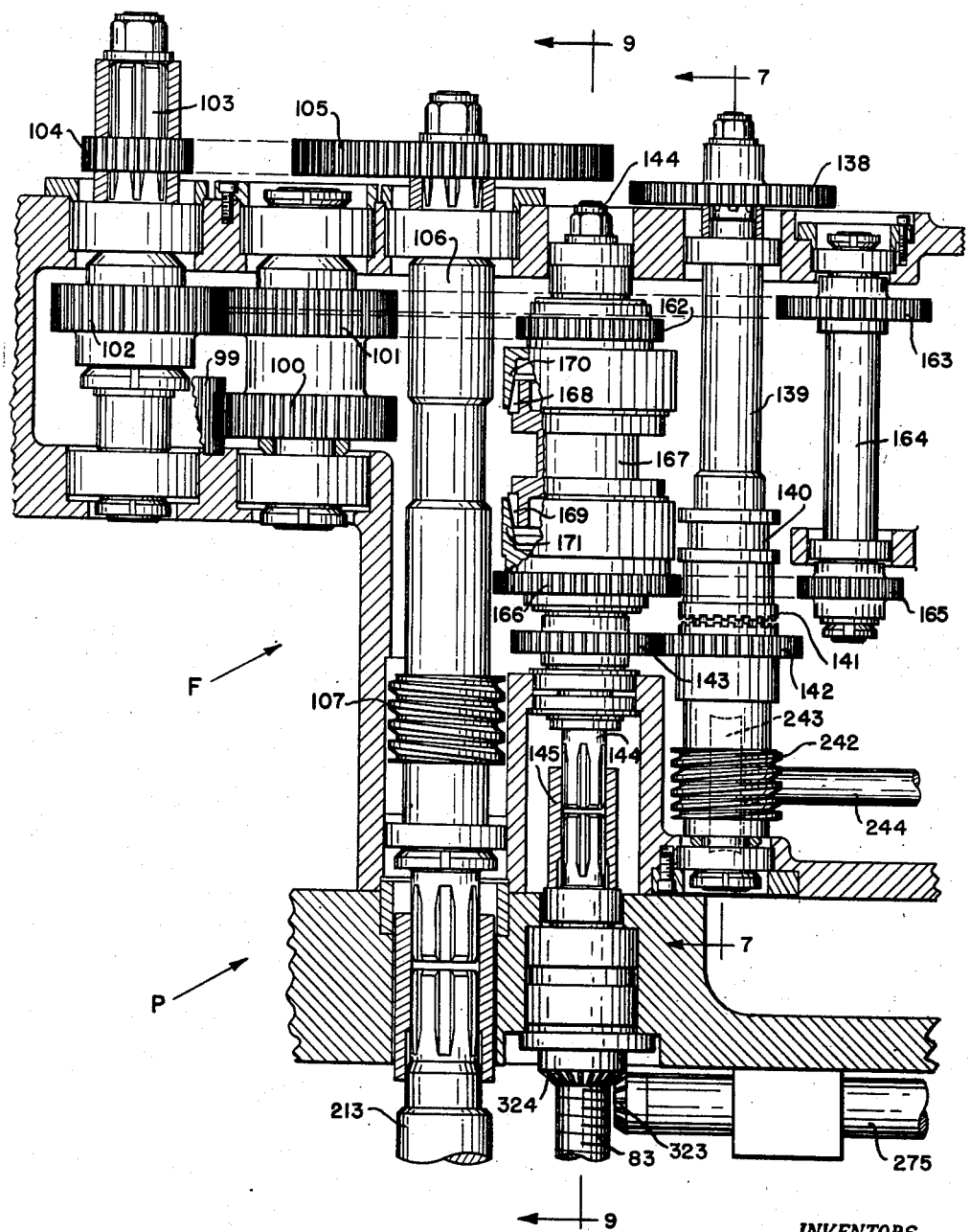
Fig. 6 is a stretch-out sectional elevational view of the feedworks shown in Figs. 4 and 5.
Figure 8:
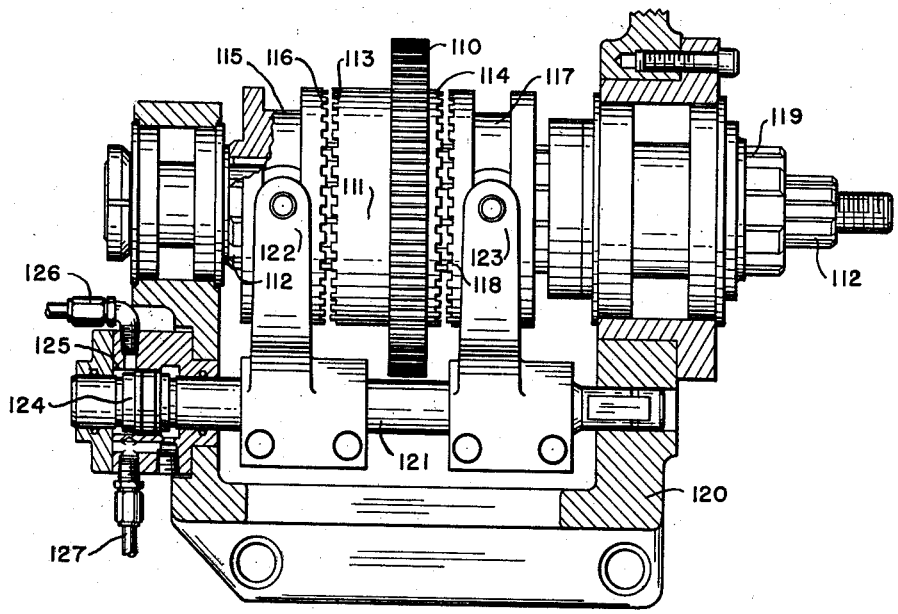
Fig. 8 is a sectional plan view taken susbtantially along line 8—8 of Fig. 5.

As previously described there is a head construction H at each of the six faces of the column K, excepting the face at the loading and unloading station L of the machine tool. Rotation of the screw 83 for each of the heads H is adapted to be effected by a corresponding feedworks transmission F (Fig. 2). Since all of the feedworks transmissions F are identical, only one will be described specifically. Referring to Fig. 6, which is a stretchout showing of the feedworks transmission F, power is adapted to be supplied to it from a bull gear 99 (see also Fig. 1) which receives its power in a manner to be described later. One gear 100 of a cluster gear is in mesh with the bull gear 99, and the other gear 101 thereof meshes with a gear 102 on a back shaft 103 of the transmission F. Another gear 104 splined to the back shaft 103 meshes with a gear 105 that is fixed to a vertically-disposed shaft 106. The shaft 106 has fixed to it a worm 107 that meshes with a worm gear 108 (Figs. 4 and 5) that is fixed to a shaft 109. A spur gear 110' is fixed to the shaft 109 and it meshes with a gear 110 integral with a sleeve 111 that is freely rotatable about the axis of a shaft 112. The sleeve element 111 is provided with positive clutch engaging teeth 113 and 114 on opposite ends thereof. A shiftable clutch spool 115 having positive clutch engaging teeth 116 is splined to the shaft 112 and is adapted to be moved rightwardly (Fig. 8) to connect the gear 110 to the shaft 112, and to be moved leftwardly to disengage the gear 110 from shaft 112. Another clutch shifting element 117 having positive clutch engaging teeth 118 is splined to a sleeve 119 that is freely rotatable about the axis of the shaft 112. The clutch element 117 is adapted to be moved leftwardly (Fig. 8) to connect the gear 110 to the splined sleeve 119, and to be moved rightwardly to disengage the gear 110 therefrom. Referring to Fig. 8, a housing 120 for the feedworks F, supports a draw bar 121. The draw bar 121 has clutch shifting fingers 122 and 123 fixed to it, which cooperate with the clutch shifting elements 115 and 117, respectively. The draw bar 121 has fixed to its one end a piston 124 that is adapted to be reciprocated within a cylinder 125 attached to the bracket 120. Liquid under pressure is adapted to be admitted to the cylinder 125 on the left-hand side of the piston 124 by a line 126, and to be admitted to the right-hand side of the piston 124 by a line 127. Accordingly, admission of liquid under pressure to the cylinder 125 from the line 126 will cause the gear 110 to be connected to the shaft 112; and, admission of liquid under pressure to the cylinder 125 through the line 127 will cause the gear 110 to be connected to the splined sleeve 119.

Referring again to Fig. 5, a spur gear 128 is keyed to the sleeve 119 and a different ratio gear 129 is keyed to the shaft 112. Gears 128 and 129 mesh with gears 130 and 131, respectively, both of which latter are keyed to a shaft 32 parallel to shaft 112. It is evident that the ratio of feed between the shaft 109 and the shaft 132 can be pre-set for coarse and fine feed by placing the proper gears on the shaft 112, the sleeve 119 and the shaft 132. The shaft 132 is provided with a usual type of rattle clutch 133 for safety purposes, and the end of the shaft 132 opposite that to which the gears 130 and 131 are connected has fixed to it a bevel pinion 134. Bevel pinion 134 meshes with a bevel gear 135 fixed to a stub shaft 136 that extends upwardly above the top of the feedworks F. A spur pinion 137 is fixed to the stub shaft 136 on the top of the feedworks F and it meshes with a spur gear 138 (Figs. 4 and 6) that is keyed to a vertically-disposed shaft 139 parallel with the shaft 106, and extending downwardly into the housing of the feedworks F.

Figure 7:
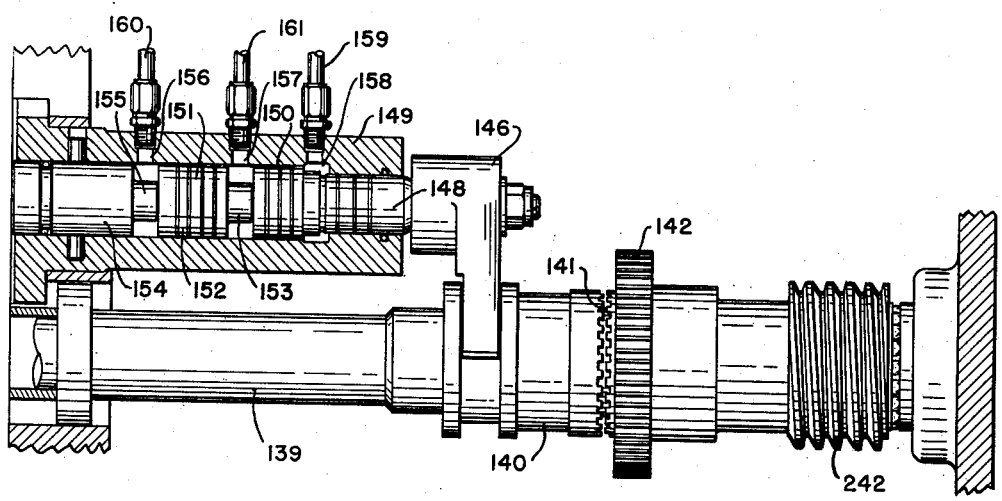
Fig. 7 is a sectional elevational view taken substantially along line 7—7 of Fig. 6, but rotated counter-clockwise through 90°.

Referring to Figs. 6 and 7, the shaft 139 is arranged in parallel relation with respect to the screw 83. The shaft 139 is provided with a clutch shifting element 140 that is splined thereto and includes positive-action clutch teeth 141. The shaft 139 also supports a spur gear 142 for free rotation thereon. The gear 142 meshes with a similar spur gear 143 (Fig. 6) that is keyed to a shaft 144 coaxial with the screw 83 and parallel with the shaft 139. Shaft 144 is coupled to the screw 83 by a sleeve coupling 145. Referring to Fig. 7, the clutch 140 is connected to a clutch-shifting finger 146 that is fixed to a piston rod 148, which latter extends into a cylinder 149 arranged in parallel relation relatively to the shaft 139. The piston rod 148 is integral with a piston 150. Within the cylinder 149 and in line with the piston 150, an auxiliary piston 151 is located. The piston 151 is provided with an enlarged portion 152 and a smaller diameter portion 153 for a purpose to be described later. The cylinder 149 has its end opposite that receiving the piston rod 148 closed by a fixed plug 154 having a portion of reduced diameter 155. Ports 156, 157 and 158 admit liquid under pressure to the cylinder 149. Constant pressure liquid is adapted at all times to be admitted to the cylinder 149 through the port 158 from a line 159, thereby acting on the effective area of the piston 150. When the ports 156 and 157 are open to exhaust, pistons 150 and 151 are urged leftwardly (Fig. 7) into abutting relation with the smaller diameter portion 155 of the plug 154, thereby maintaining the positive action clutch teeth 141 out of engagement with the positive action clutch teeth of the gear 142.

The ports 156 and 157 in the cylinder 149 are connected to lines 160 and 161, respectively. The admission of liquid to either of the lines 160 and 161 will cause the piston 148 to move rightwardly (Fig. 7) and the clutch 140 downwardly (Fig. 6), thereby effecting engagement between clutch teeth 141 and those on the gear 142 to thereby cause the rotation of the screw 83 and to move the head H downwardly.

Referring again to Fig. 5, it will be noted that the two sets of gears 128, 130 and 129, 131 provide fast and slow rates of rotation of the shaft 132, respectively. Should the clutch 117 be connected to gear 110, gears 128 and 130 rotate the shaft 132 at a relatively rapid rate; and should the clutch 115 be engaged with the gear 110, the shaft 132 is rotated through the gear train 129 and 131 at a relatively slow rate. From the foregoing, it is evident that the head H can be fed at a fast or slow rate depending upon whether clutch 117 or 115 is connected to gear 110. Of course, the gears 128, 129, 130 and 131 are change gears and any desired feed rates can be provided by selecting the proper gear ratio between shafts 112 and 132.

Referring again to Fig. 6, the gear 102 meshes with a gear 162 journaled on the shaft 144. This gear 102 also meshes with a gear 163 that is fixed to a shaft 164 parallel with the shaft 144. Another gear 165 fixed to shaft 164 meshes with a gear 166 journaled on the shaft 144. From the foregoing, it is evident that the gears 162 and 166 rotate in opposite directions at relatively fast rates of speed, as distinguished from the speed at which the gear 143 can be rotated. A shiftable clutch mechanism 167 is splined to the shaft 144 and is provided with friction, clutch-engaging portions 168 and 169 that are adapted to cooperate with mating clutch-engaging surfaces 170 and 171 fixed to the gears 162 and 166, respectively. The shifting of the clutch element 167 upwardly and downwardly will effect the relatively rapid rotation of the screw 83 to thereby provide a rapid traverse rate of motion of the head H either upwardly or downwardly.

Figure 9:
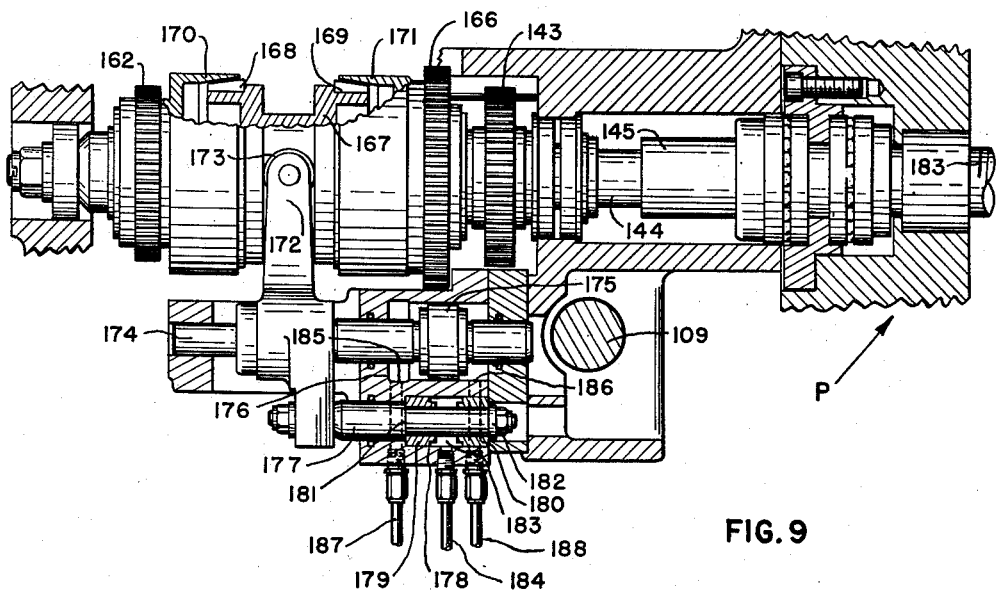
Fig. 9 is a sectional elevational view taken substantially along line 9—9 of Fig. 6, but rotated counter-clockwise through 90°.

Referring to Fig. 9, a clutch shifting finger 172 is provided with a roller 173 that cooperates with a groove within the clutch mechanism 167. The finger 172 is fixed to a shaft 174 to the one end of which is attached a piston 175 that is adapted to be reciprocated within a cylinder 176. Finger 172 is likewise fixed to a piston rod 177 parallel with the shaft 174 and extending into a cylinder 178. Pistons 179 and 180 are slidably mounted on the rod 177 within the cylinder 178. The rod 177 is provided with a shoulder 181 that cooperates with the piston 179, and a washer 182 that cooperates with the piston 180. Cylinder 178 is provided with a port 183 connected to a line 184 through which liquid under constant pressure is continuously adapted to be supplied. The construction and arrangement of the parts are such that the pistons 179 and 180 are constantly urged apart, normally maintaining the clutch 167 in a neutral position. The cylinder 176 is provided with ports 185 and 186 connected to lines 187 and 188, respectively. The ports 185 and 186 are located on opposite sides of the piston 175 so that the admission of liquid under pressure to the cylinder 176 through the line 187 will cause piston 175 to move rightwardly (Fig. 9), since the effective area of the piston 175 is substantially greater than the effective area of the pistons 179 and 180. Rightward movement of piston 175 will effect the engagement of the clutch elements 169 and 171 to cause the screw 83 to rotate in a relatively rapid rate in one direction. Admission of liquid under pressure to the line 188 and exhausting the liquid in line 187 causes the piston 175 to move leftwardly (Fig. 9) thereby effecting the engagement of the clutch elements 168 and 170, whereupon the screw 83 is caused to rotate in a reverse direction at a relatively rapid rate. Exhausting both the lines 187 and 188 immediately causes the pressure within the line 184 to neutralize the clutch 167.

Referring to Figs. 1 and 2, a main electric motor M is rigidly bolted to the top of platform P' and is coupled to a shaft 189 to which is fixed a bevel pinion 190. The bevel pinion 190 meshes with a bevel gear 191 fixed to the top of a vertically-disposed shaft 192 that extends downwardly into the compartment formed by the platforms P and P'. The bottom end of the shaft 192 is provided with a spur pinion 193 that meshes with a spur gear 194 (Fig. 2) journaled within a bracket 195 located within the compartment formed between the platforms P and P'. The spur gear 194 meshes with the bull gear 99, and from an inspection of Fig. 2, it is evident that the bull gear 99 meshes with each of the input gears 100 of the feedworks F at the five working stations about the column K. From the foregoing description of the feedworks F, it is evident that feeding and traverse movements of the heads H at each of the work stations can be effected independently of the other.

Figure 14:
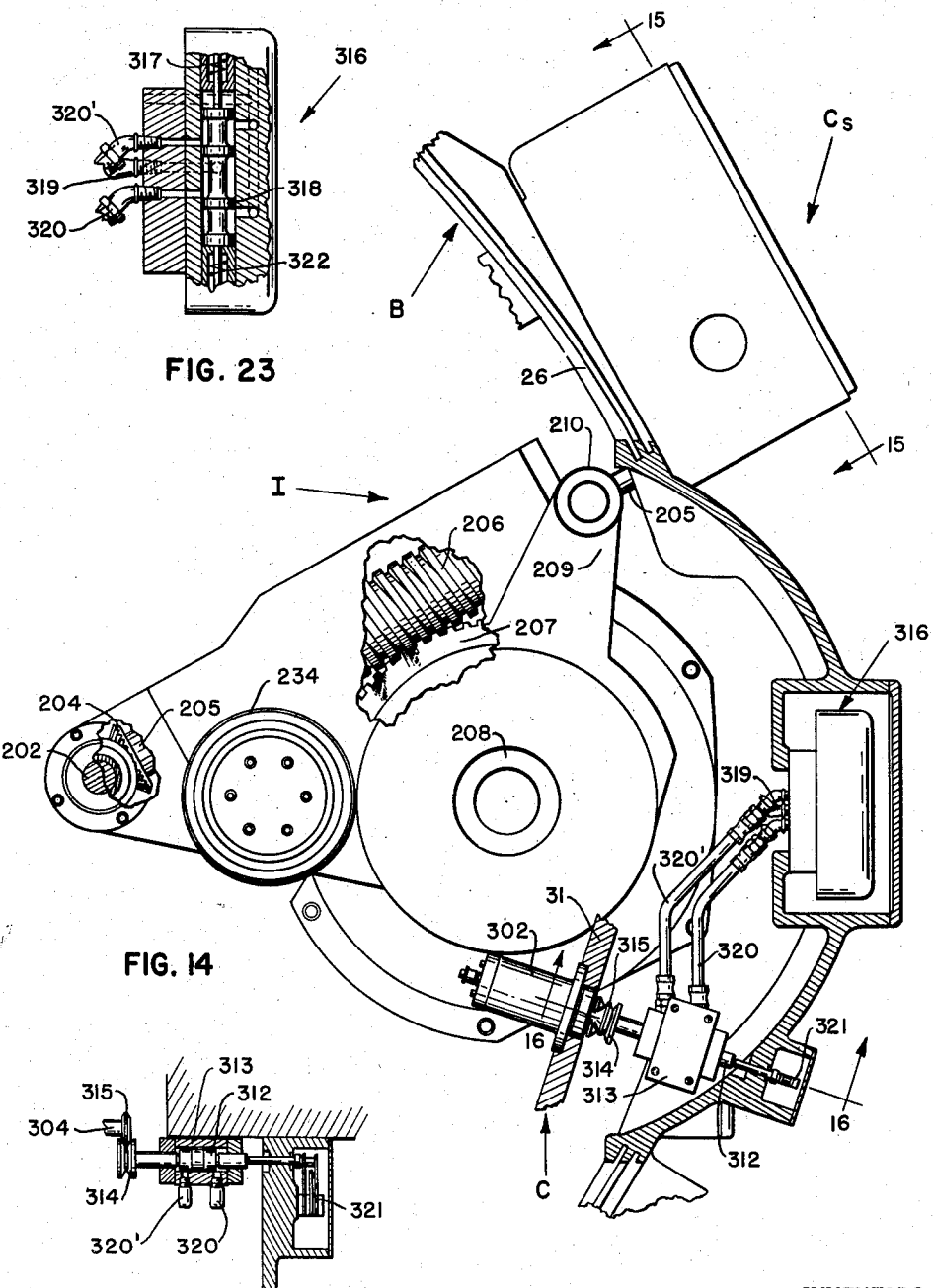
Fig. 14 is a plan view of the indexing mechanism looking in the direction of the arrows along line 14—14 of Fig. 1.

When a working operation has been completed at all of the five working stations about the column K, the carrier C is adapted to be indexed to its next succeeding position. Accordingly, the bracket 195 supports a shaft 196 containing a spur gear 197 that meshes with the gear 193 on the shaft 192. The gear 197 is journaled on the shaft 196, and a clutch and brake mechanism 198 is splined to the shaft 196 so that the shaft 196 is unaffected by the rotation of the gear 197 except when the clutch portion of the mechanism 198 is rendered effective. Spur gears 199, 200 and 201 transfer the rotative power from shaft 196 to a vertically disposed shaft 202 that extends downwardly through the inside of column K to a point within the base B. The bottom of the shaft 202 is provided with a bevel gear 203 that meshes with a similar bevel gear 204 fixed to a horizontally disposed shaft 205. Referring to Fig. 14, the shaft 205 has fixed to it a worm 206 that meshes with a worm gear 207 keyed to a shaft 208 (Fig. 1) of the indexing mechanism I. The shaft 208 also supports a crank arm 209 at the top thereof having a roll 210 that is adapted to cooperate with shoes 211 (Fig. 1) fixed to the under surface of the carrier C. The construction and arrangement of the crank 209 and the shoes 211 are such that the roll 210 cooperates with the shoes 211 in a manner to start the indexing movement of the carrier C from zero and gradually build up its speed of index during the first half portion of the index, and to reduce its speed of index during the last half portion of index. Such an arrangement of parts reduces to a minimum any possible shock due to indexing. The action of the roll 210 and the shoes 211 is substantially the same as that shown in Patent 2,540,186 to E. P. Bullard et al., granted February 6, 1951.

Figure 24:
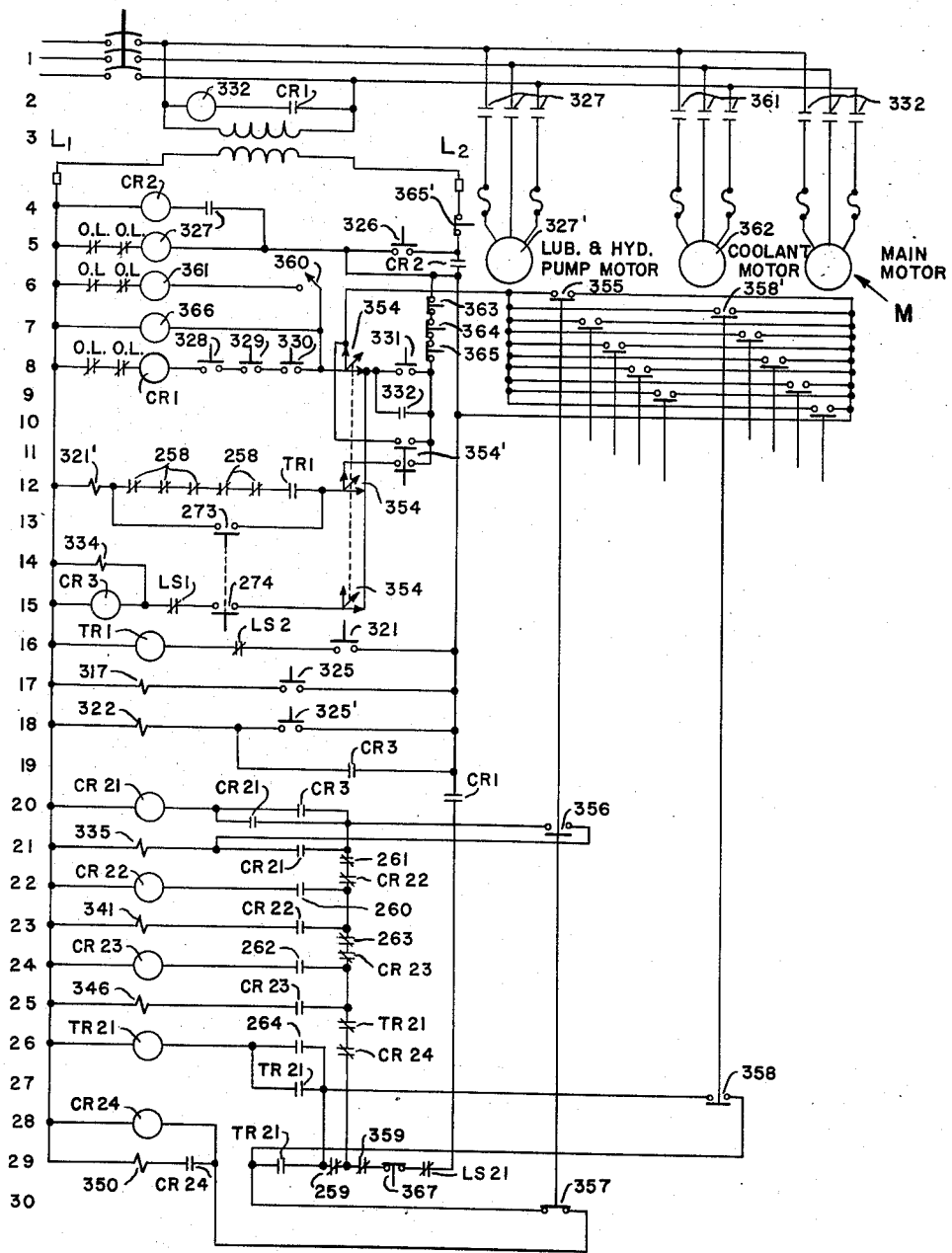
Fig. 24 is an electrical wiring diagram of certain of the essential elements of the machine tool to which the principles of the invention have been applied.

Referring to Figs. 1 and 13, when the draw bar 47 of the spindle mechanism S is moved downwardly to thereby effect the chucking of work on the spindle S, a circuit is established (as will be described later in connection with the wiring diagram of Fig. 24) which energizes a solenoid for controlling the flow of liquid under pressure to a cylinder 212 (Fig. 1) to thereby cause the clutch and brake portions of the mechanism 198 to become effective and ineffective, respectively. Accordingly, the shafts 202 and 205 are caused to rotate, thereby effecting the rotation of the worm wheel 207 and the rotation of the crank 209, which latter through the cooperation of the roll 210 and the shoes 211 effects the indexing of the carrier C. A control cam (to be described later) is caused to be rotated with the crank 209 such that upon the completion of a single indexing motion of the carrier C, the circuit for the solenoid of the cylinder 212 is de-energized and the clutch and brake portions of the mechanism 198 are rendered ineffective and effective, respectively.

Indexing of the carrier C from station to station obviously requires the disengagement of the drive for the spindles S at the work stations prior to an indexing motion, and the re-engagement of such driving mechanism at the work station to which the spindles are indexed. Additionally, as the spindles S are moved into the loading station L, it is necessary to stop their rotation so that completed work can be removed from the spindles and rough work chucked thereto. Referring to Figs. 1 and 6, the shaft 106 is coupled to a shaft 213 that extends downwardly into the base B of the machine and is journaled in a bracket 214 that is stationarily mounted within the base B of the machine. A spur gear 215 is splined to the lower end of the shaft 213 and it meshes with a spur gear 216 (Fig. 12) integral with a hollow cylindrical member 216' that is also journaled in anti-friction bearings within the stationary bracket 214. A friction engaging clutch element 217 is fixed to a flange 218 integral with a hollow cylindrical member 217' that extends downwardly through the center of, and is splined to the hollow member 216'. A toothed element 219 is integral with a sleeve member 220 that is fixed to a cylinder 221 concentric with the hollow cylindrical member 217'. The lower portion of the cylinder 221 is closed by a flange 222, and a spring 223 is located between the cylinders 221 and 217'. The hollow cylindrical member 216' is closed by an end plate 224 and a non-rotatable piston and piston rod 225 extends upwardly through, and is journaled within the cover plate 224. Referring to Fig. 1, a shaft 226 for each set of spindles S is journaled in the carrier C such that when the carrier is at each of its index positions, each of the shafts 226 will be axially aligned with the axis of rotation of one of the clutch elements 217. A friction clutch engaging member 227 is fixed to each shaft 226 and it is adapted to cooperate with a corresponding clutch engaging surface 217. An internal toothed element 228 is formed concentrically of the friction clutch engaging surface 227 and it is adapted to mesh with the toothed element 219 when the latter is moved upwardly as will be described later. Another spur gear 229 is fixed to each of the shafts 226 and it meshes at all times with spur gears 230 and 231 (Fig. 3) that are fixed to cylindrical members 40 (Fig. 13) of the pair of spindles S at each station. From the foregoing description, it is evident that the shaft 213 and gears 215 and 216 (Fig. 12) continuously rotate while power is being applied to the machine tool through the motor M in such a manner that all relative torque due to the rotation of gear 215 is absorbed by the stationary bracket 214. Furthermore, the speed at which the spindles S at any of the work stations can be rotated is dependent upon the preselected ratio of the pull gears 104 and 105 (Fig. 6).

Figure 12:
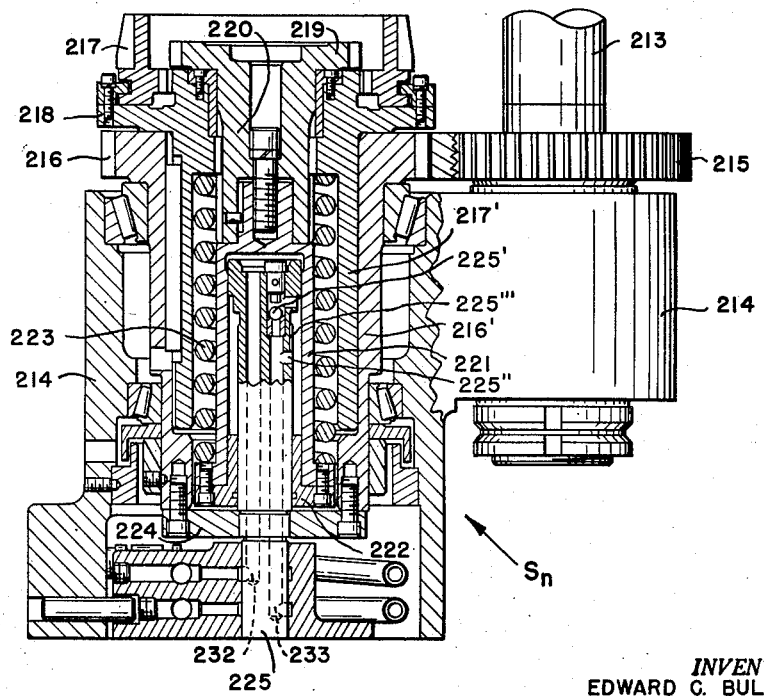
Fig. 12 is an enlarged partial sectional elevational view of the synchronizing mechanism $S_n$ shown in Fig. 1.

Referring to Fig. 12, the stationary piston 225 is provided with a ball check valve 225', and a port 225" having a groove 225''' associated with the latter, all for a purpose to be described later.

The admission of liquid under pressure through a passage 232 within the stationary piston member 225 (Fig. 12) will cause the upward movement of the cylindrical members 221 and 217', together with the friction engaging surface 217 until the latter cooperates with the friction engaging surface 227 (Fig. 1), whereupon the speed of the spindles S at a given station is synchronized with the speed of rotation of the corresponding clutch surface 217. During this upward movement of the cylindrical member 221, the liquid beneath the head of piston 225 is exhausted through port 225". When the clutch surfaces 217 and 227 have engaged, the gland 222 will have cut off exhaust port 225" so that further exhausting of the space beneath the head of piston 225 must pass through the restricted groove 225'''. The continued application of pressure liquid through the duct 232 causes the cylinder 221 and the toothed element 219 to continue to move upwardly but at a relatively slow rate thereby compressing the spring 223 until the toothed element 219 positively meshes with the toothed element 228 integral with the clutch engaging surface 227 (Fig. 1). Conversely, exhausting the line 232 and admitting liquid under pressure to a passage 233 (Fig. 12) causes it to open the ball check valve 225' and to act on the gland 222 thereby forcing the toothed element 219 and the clutch surface 217 downwardly to the position shown in Fig. 12 where the clutch surface 217 has become disengaged from the clutch surface 227, and the spring 223 has disengaged the element 219 from the internal toothed element 228.

Each of the five working stations about the column K is provided with an identical synchronizing mechanism $S_n$ as well as a corresponding drive shaft 213, the speed of the latter of which can be varied as previously explained by changing the pull gears 104, 105 at each of the feedwork stations about the column K. Since the spindles S at the loading station L must be stopped, a brake mechanism is provided in place of, and simultaneously operable with the synchronizing mechanisms $S_n$ at the various working stations.

Referring to Fig. 1, the brake mechanism is identical with the synchronizing mechanism with the exception that the toothed element 219 and its attending mechanism are omitted, and the friction engaging surface 234 thereof is fixed against rotation as distinguished from the rotatable construction of the clutch engaging surface 217. Accordingly, as the non-rotatable surface 234 is moved upwardly (Fig. 1), in timed relation with the actuation of the synchronizing mechanisms $S_n$, it cooperates with a corresponding clutch engaging surface 227 at the loading station L, thereby effectively stopping the rotation of the spindles S at the loading station.

When the carrier C has been indexed to a station, it is evident that it must be accurately locked at that station during the work-performing operations of the heads H. Referring to Fig. 3, the carrier C is provided with a toothed element 235 at equally-spaced locations about the periphery thereof and between each adjacent pair of spindles S. Each of the toothed elements 235 is provided with an adjusting mechanism 236 for locating it correctly to effect accurate locking of the carrier C in each of its index positions. Mounted in the base B, a bracket 237 is adapted to support a cylinder 238 within which a piston 239 is adapted to be reciprocated. The piston 239 includes a portion 240 having a bifurcated forward end 241 adapted to cooperate with the toothed elements 235 about the carrier C. Liquid under pressure is continuously admitted to the left side of the piston 239, which when the right side of piston 239 is exhausted, causes the bifurcated member 241 to move into engagement with the toothed element 235 thereby locking the carrier C. The area of the right-hand side of piston 239 is greater than that of the left-hand side, so that admission of liquid under pressure to the right-hand side causes the piston 239 to move leftwardly thereby permitting the carrier C to be indexed.

Figure 19:
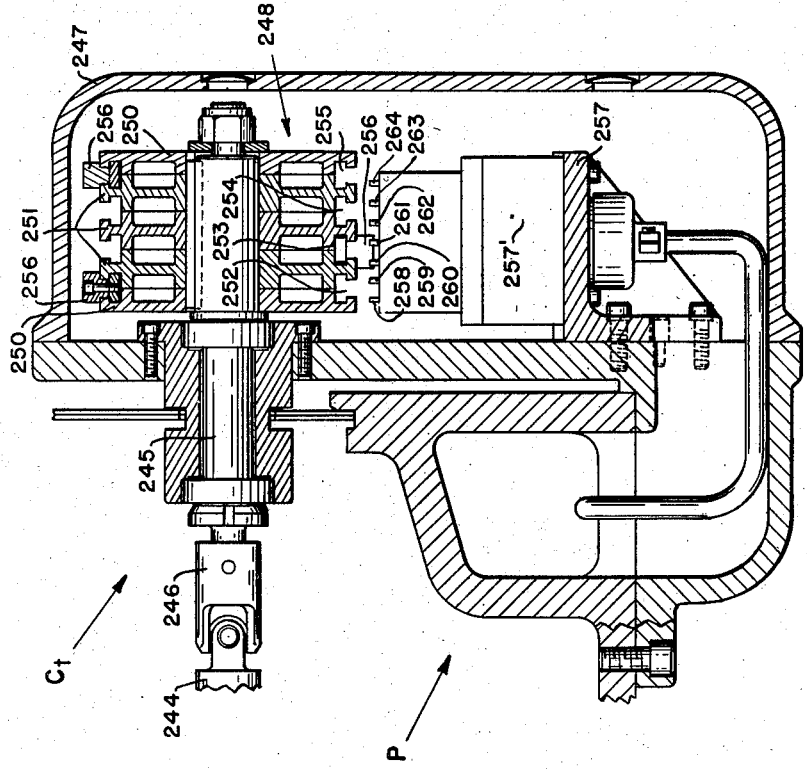
Fig. 19 is a sectional elevational view taken substantially along line 19—19 of Fig. 2.

Referring to Figs. 1, 2, 18 and 19, each the feedworks F is provided with a separate control $C_t$, all of which are identical, and therefore, only one will be described specifically. Referring to Fig. 6, a worm 242 integral with gear 142 meshes with a worm gear 243 fixed to a shaft 244. Referring to Fig. 19, the shaft 244 is connected to a shaft 245 by a universal joint 246. The shaft 245 extends into a housing 247 of the control $C_t$ and has keyed to it a control drum 248. The drum 248 is made up of a plurality of individual discs 250 and 251 forming between adjacent ones, grooves 252, 253, 254 and 255. Dogs 256 are adapted adjustably to be located peripherally around the drum 248 in the slots 252 to 255. Also located within the housing 247 is a support 257 on which is mounted a switch box 257' containing switches 258, 259, 260, 261, 262, 263, and 264. The peripheral dimension of the drum is proportional to the travel of the head H, and since there is a positive geared drive between the screw 83 and the drum 248, it is evident that every point about the drum corresponds to a point in the travel of the head H. Accordingly, pre-setting a dog 256 in the slot 252 to simultaneously operate switches 258 and 259 will simultaneously stop upward traverse movement of the head H and condition an electrical circuit (to be described later) for starting the indexing of the carrier C. The switches 260 and 261 within the switch box 257' are adapted to control the extent of coarse feed, and the switches 262, 263 are adapted to control the duration of fine feed. These two feeds, as previously described, are effective by the shifting of the clutches 115 and 117 (Fig. 8). The switch 264 within the switch box 257' is a timer switch for a purpose to be described later.

Figure 15:
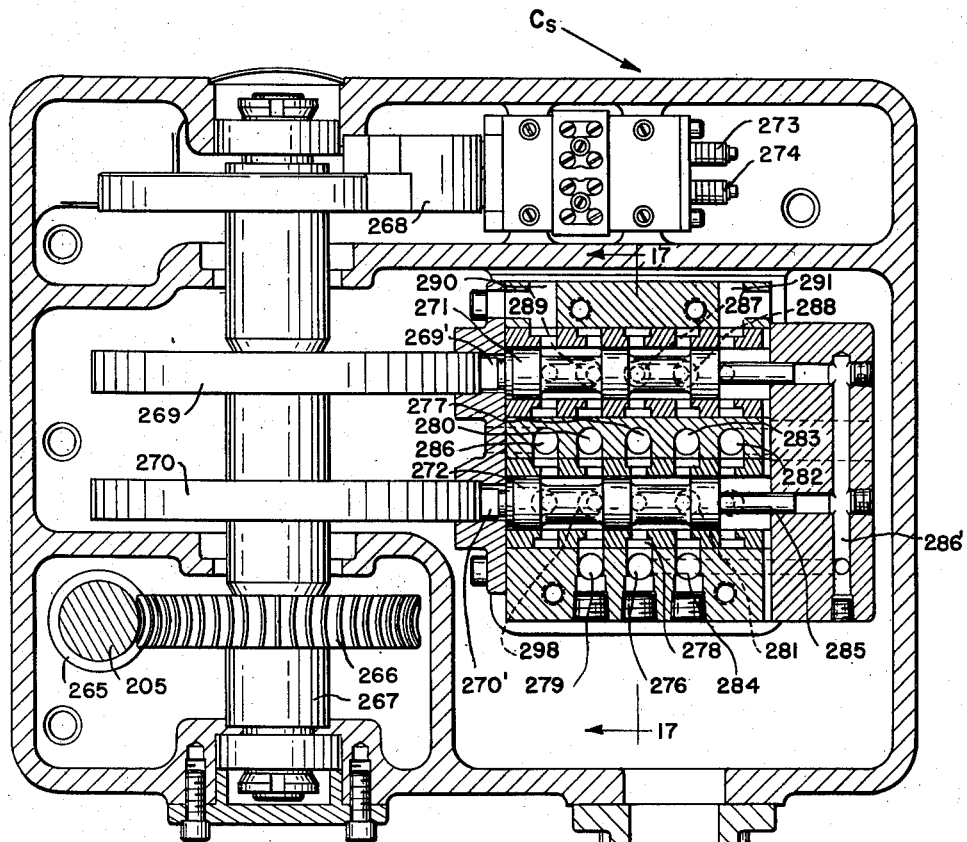
Fig. 15 is a sectional elevational view taken substantially along line 15—15 of Fig. 14, showing parts of the control mechanism for the synchronizing mechanism $S_n$ of Fig. 12.

In order to correlate the various functions of the machine tool, an additional control $C_s$ (Figs. 14, 15, and 17) is employed. Referring to Figs. 1 and 15, rotation of the index driving shaft 205 not only drives the worm 206 of the indexing mechanism I, but also drives a worm 265 (Fig. 15) that meshes with a worm wheel 266 fixed to a shaft 267 within the control $C_s$. Three cams 268, 269 and 270 are rigidly fixed to shaft 267. The cams 269 and 270 control the position of spool valves 271 and 272 for a purpose to be described later. The cam 268 is adapted to actuate switches 273 and 274. The switch 274 is employed to initiate the down traverse movement of the head H in timed relation with respect to the completion of the indexing of the carrier C, and the switch 273 is employed as a hold-over switch to effect the completion of the indexing operation after the heads H have begun their downward traverse movement which action opens certain index-initiating switches.

Figure 17:
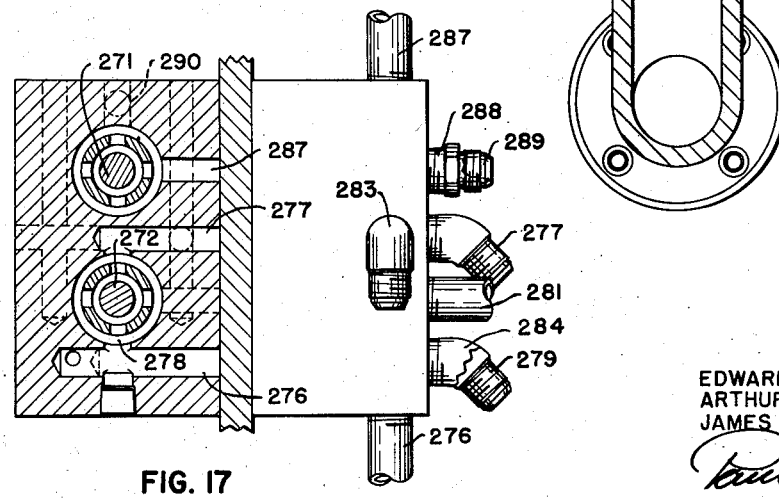
Fig. 17 is a sectional view taken substantially along line 17—17 of Fig. 15.
Figure 18:
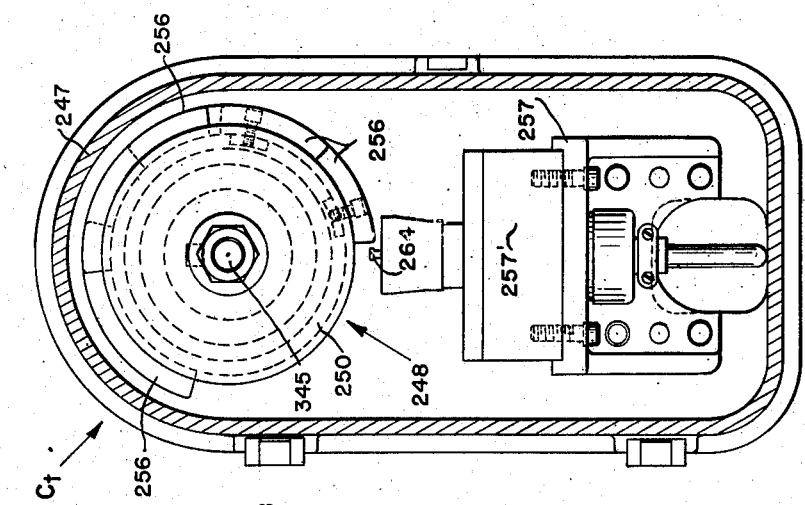
Fig. 18 is an elevational view looking in the direction of the arrows and along line 18—18 of Fig. 2.

The spool valve 272 includes a stem portion extending into a pressure chamber 286', and with the parts in the position shown in Fig. 15, the spool valve 272 is forced leftwardly and is not affected by a dog 270' on the cam 270. Accordingly, liquid under pressure from an accumulator 275 (Fig. 1) is admitted through lines 276 and 277 to a distributing groove 278 surrounding the spool valve 272. The pressure liquid passes the spool valve 272 to the lines 283 and 284 (Figs. 15 and 17). The line 283 is connected in series with three of the synchronizing units $S_n$ such that the passage 233 (Fig. 12) of each is supplied with pressure liquid to effect disengagement of the drive for the spindles S at each of said three stations. The other line 284 is connected in series relation to the other two synchronizing units $S_n$ for disengaging the driving of the spindles S at the other two working stations in the same way.

With the spool valve 272 in the position shown in Fig. 15, a port 281 connected to the lock pin cylinder 238 (Fig. 3) is open to lines 276 and 277 so that pressure liquid acts on the right side of piston 239 maintaining the bifurcated portion 241 thereof disengaged from the toothed element 235 on the carrier C. Likewise, lines 279 and 280 are connected to the passages 232 of the synchronizing unit $S_n$ (Fig. 12) in the same manner as the lines 283 and 284 are connected to the passages 233 of said units. In the condition shown, the lines 279 and 280 and, consequently, passage 232 of the synchronizing mechanisms $S_n$, are open to exhaust port 286.

When the cam 270 is rotated to a position such that its dog 270' forces the spool valve 272 rightwardly, the lines 276 and 277 are connected to lines 279 and 280; while, at the same time, the lines 283 and 284 are connected to another exhaust port 282. When this occurs, the lines 233 of all of the synchronizing units $S_n$ are exhausted through lines 283, 284 and port 282, and the passages 232 thereof (Fig. 12) are supplied with pressure liquid through lines 279 and 280 to thereby effect the operation of each synchronizing unit $S_n$ as previously described. Additionally, with the spool valve 272 in its rightward position, the port 281 that is connected by a line to the right-hand side of cylinder 238 exhausts through port 282, thereby permitting the continuously acting constant pressure liquid to move piston 239 rightwardly in a manner to effect engagement between the bifurcated end 241 and the toothed element 235 on the carrier C.

Referring to Fig. 15, pressure liquid is adapted to be supplied to the manifold including spool valve 271 from an accumulator through the line 287 (Figs. 15 and 17). In the position in which the spool 271 is shown, this pressure liquid flows through a port 288 that is connected to the brake 234 (Fig. 1) in the same way as the passage 283 is connected to the passage 233 (Fig. 12) of the synchronizing unit $S_n$. The brake mechanism 234 is accordingly forced downwardly out of engagement with the clutch engaging portion 227. A passage within the brake mechanism 234 corresponding to the passage 232 within the synchronizing mechanism (Fig. 12) is in communication with a port 289 (Fig. 15) which is open to an exhaust port 290. As shown in Fig. 15, the cam 269 with its dog 269' has not forced the valve 271 rightwardly; consequently, it is maintained in a leftward position by the liquid under pressure within the passage 286'. Rotation of the cam 269 causes its dog 269' to move spool valve 271 rightwardly thereby cutting off the port 289 from the exhaust 290 and connecting it with the brake accumulator line 287. Furthermore, this rightward movement of the valve 271 opens the port 288 to an exhaust 291. In this condition of valve 271, the brake 234 moves upwardly into cooperating position with respect to the clutch engaging element 227 thereby stopping the rotation of the gear 229 (Figs. 1 and 3) and the spindles S at the loading station L.

In order to maintain the hydraulically-actuated chucks of the spindles S in proper effective condition throughout the operation of the machine tool, it is necessary to supply pressure liquid to each of the chuck mechanisms at each of the stations about the column K, as well as between the various stations during the indexing of carrier C. Means also must be provided for unchucking and chucking the work at the loading station L. In the present invention, this has been accomplished by providing a transfer unit 292 at each of the stations about the column K (Figs. 3 and 13). Each of the transfer units 292 is identical and comprises a cylinder 293 within which a piston 294 is adapted to be reciprocated. The piston 294 is provided with a duct 295 in communication with an inlet 296 that is supplied with liquid under pressure from a pump (not shown) within the base B at the loading station L. Liquid under pressure is also adapted to be supplied to cylinder 293 through a line 297 that is connected to a port 298 within the control unit $C_s$ (Fig. 15). The port 298 is adapted to be supplied with liquid under pressure simultaneously with the supplying of liquid under pressure to the passages 279 and 280 that render effective the synchronizing mechanisms $S_n$. The port 298 is adapted to be opened to the exhaust port 286 when the passages 279 and 280 are open to that exhaust port. A compression spring 299 surrounding the piston 294 (Fig. 13) urges the piston 294 leftwardly when the line 297 is open to the exhaust port 286 (via the port 298) as previously described. The front end of the piston 294 is adapted to make a sealed connection with a transfer element 300 when the carrier C is at a station about the column K. From the foregoing, it is evident that when the carrier C is indexed to each station about the column K, and the synchronizing mechanisms $S_n$ are effective to rotate the various spindles at the working stations of the machine tool, a positive seal is made between the piston 294 and the transfer element 300 at each station by virtue of the liquid under pressure from the line 297 acting against the piston 294. When it is desired to index the carrier C, the line 297 is exhausted (as shown in the drawings) so that spring 299 moves piston 294 leftwardly out of sealing engagement with the transfer element 300. However, this does not relieve the chucking pressure since a groove 301 (Figs. 3 and 13) maintains liquid under pressure at each of the spindles S even while the carrier C is being indexed between stations. This is necessary in order to prevent the unchucking or loosening of work within each chuck of each spindle S during an indexing operation. Adequate chucking pressure, of course, during the actual working operations by the heads H is ensured by the sealed connection between piston 294 and element 300 as previously explained. Each transfer element 300 is connected by a line 303 to a separate transfer valve 302 that is fixed to the carrier C. Each transfer valve 302 is the same, and only one will be described specifically. It includes a spool 304 which, in the position shown in Fig. 13, permits pressure liquid from the line 303 to be admitted to lines 305 and 306 while lines 307 and 308 are open to an exhaust port 309. The line 305 is adapted to be connected to a fitting 310 leading to the passage 58, while the line 306 is adapted to be connected to a corresponding fitting leading to the corresponding passage in the other spindle S, forming the pair at the station under consideration. Accordingly, the draw bars 47 of the two spindles S are moved downwardly, thereby effectively chucking the work on the spindles S. The fittings 307 and 308 are connected to a fitting 311 and a corresponding fitting for the second spindle of the group being described. Movement of the spool 304 rightwardly (Fig. 13) will cause liquid under pressure to flow from the line 303 into the lines connected to the fittings 307 and 308 thereby causing the draw bars 47 of both spindles S to be moved upwardly, hence unchucking the work on the spindles S.

Referring to Figs. 14 and 16, a valve-operating piston 312 is mounted within a cylinder 313 that is located on a stationary part of the base B of the machine tool at the loading station L. The piston 312 is provided with a grooved head 314 adapted to cooperate with a head 315 on each of the spools 304 located about the carrier C. The construction and arrangement of the parts are such that as the carrier C is indexed from station to station, and each pair of spindles S is moved into the loading station L, the corresponding spool 304 thereof engages the grooved element 314 on the piston 312. A four-way solenoid operated valve 316 (Fig. 23) is adapted to control the supply of liquid under pressure to the cylinder 313. In the position shown in Fig. 23, the winding 317 of the valve 316 has been energized, forcing a spool 318 thereof downwardly so that pressure from a line 319 passes through the valve 316 to a line 320 thereby forcing the piston 312 (Fig. 16) leftwardly, which action, incidentally, closes the contact of an electrical switch 321 for a purpose to be described later.

Energization of the coil 322 of the solenoid valve 316 causes the spool 318 thereof to move upwardly, thereby effecting the movement of the piston 312 rightwardly by causing the pressure liquid to flow from line 319 through line 320'. Rightward movement of piston 312 moves the spool 304 of valve 302 rightwardly, thereby effecting the upward movement of the draw bars 47 of the spindles S at the loading station L to thereby release the work chucked thereon.

In order manually to move the heads H during the setting up of the machine tool, provision is made for inserting a hand crank gear 323 (Figs. 6 and 10) at each of the stations about the machine tool where a feedworks F is located. The gear 323 meshes with a corresponding bevel gear 324 that is fixed to the screw 83. Accordingly, rotating the hand crank gear 323 will effect the rotation of the screw 83 thereby causing the movement of the head H upwardly or downwardly, depending upon the direction of rotation of the gear 323.

Reference in Fig. 24 will be made to numerals in parentheses to assist in locating the elements described. These numerals in parentheses refer to those on the left-hand side of Fig. 24.

Manually closing a push-button switch 326 (line 5) energizes a relay 327 (line 5). Energization of the relay 327 closes its 327 switches (line 2) of the lubricant and hydraulic pump motor 327'. Closing switch 326 also energizes CR2 relay (line 4) which closes CR2 switch (line 5) to hold relay 327 energized after release of push-button switch 326. When the hydraulic pressure from pump motor 327' becomes adequate, the three pressure switches 328, 329 and 330 (line 8) close. Accordingly, manually closing the start-drive switch 331 (line 8) energizes the CR1 relay (line 8). Energization of the CR1 relay (line 8) closes the CR1 switch (line 2) thereby energizing a relay 332 (line 2). Energization of the relay 332 effects the closing of the 332 switches in the circuit for a main drive motor M. Furthermore, energization of the relay 332 also closes the 332 switch (line 9) thereby holding the energization of the CR1 relay after the start-drive switch 331 is released. With all of the feedworks F preset manually for performing the desired working operations at the various work stations, and with all the heads H in their uppermost positions, the index interlock switch 258 (line 12) on each control drum 248 of each feedworks F is closed. With a rough workpiece on each of the spindles S at the loading station L, depressing the treadle switch 325 (Fig. 1 and Fig. 24, line 17) energizes the winding 317 (line 17) of the valve 316 (Fig. 23) which causes the spool 318 to move downwardly to the position shown in Fig. 23, thereby moving the spool 304 to its leftward position and consequently effecting the downward movement of the draw bars 47 of the spindles S at the loading station L. Accordingly, the work is effectively chucked and the switch 321 (line 16) is closed. Closing the switch 321 energizes the TR1 relay (line 16) which in turn effects the closing of TR1 switch (line 12). Closing of the TR1 switch energizes the indexing solenoid 321' (line 12) since all of the switches 258 at the stations 2, 3, 4, 5 and 6 have been closed by virtue of the heads H at said stations being in their uppermost positions as previously described. Energization of solenoid 321' effects the engagement of the clutch 198 (Fig. 1) to thereby start the rotation of the shaft 202 and the indexing crank 209.

After approximately 11° of motion of the crank arm 209, the dog 270' on the cam 270 (Fig. 15) has released the spool valve 272 (as shown in Fig. 15), and the pressure within the chamber 286' has moved the spool valve 272 leftwardly thereby connecting the passages 279 and 280 with the exhaust 286, and opening the ports 283 and 284 to the lines 276 and 277. This action of the spool valve 272 exhausts the passage 232 (Fig. 12) and admits liquid under pressure to the passage 233 thereby effecting the disengagement of the synchronizing mechanisms $S_n$ at all of the work stations. Additionally, with the spool valve 272 in its leftward position, pressure liquid is admitted to the port 281 (Fig. 15) which, as previously described, is connected to the cylinder 238 so as to act on the right-hand face of the piston 239 (Fig. 3). Accordingly, the piston 239 and the bifurcated portion 241 is moved leftwardly out of engagement with the tooth element 235. Continued rotation of the crank arm 209 causes the roll 210 thereon to cooperate with the shoes 211 to thereby index the carrier C from one station to the next succeeding station. After approximately 165° of rotation of the crank arm 209 and after the carrier C has come to rest in its new index position, the dog 270' on the cam 270 moves the spool 272 such that the port 281 is exhausted. Accordingly, constant pressure liquid acting on the lefthand face of the piston 239 (Fig. 3) causes its bifurcated end 241 effectively to engage one of the toothed elements 235 on the periphery of the carrier C thereby locking the carrier in its new index position. Also, the passages 283 and 284 (Fig. 15) will be exhausted while the passages 279 and 280 will be connected to the passages 276 and 277 whereupon liquid under pressure is admitted to the passage 232 (Fig. 12) in all of the synchronizing mechanisms $S_n$ to thereby cause them to become effective to rotate the spindles S at the working stations of the machine tool in the manner previously described. Simultaneously with the movement of the spool 272 rightwardly which occurred after approximately 165° rotation of the crank arm 209, the dog 269' on the cam 269 (Fig. 15) moves the spool 271 rightwardly. Rightward movement of the spool 271 opens the passage 288 to the exhaust 291 and connects the passage 289 with the passage 287. Accordingly, the fixed brake element 234 is moved upwardly into cooperating position with the element 227 at the loading station L to thereby effectively stop the rotation of the spindles S at said loading station. Approximately 8° before the end of the index motion of the crank arm 209, the dog 269' on the cam 269 releases the spool 271 whereupon the pressure within the passage 286' moves it leftwardly to the position shown in Fig. 15. Accordingly, the passage 289 is open to the exhaust 290, and the passage 288 is in communication with the passage 287 thereby effecting the downward movement of the brake member 234 (Fig. 1). This makes it possible to manually turn the spindles S at the loading station L during the removal of finished work and the replacement thereof of unmachined work.

Since there is a substantial time element between the locking of the carrier at its new index position, and the completion of the index motion of the crank arm 209, it is often desirable to begin the downward traverse movement of the head H prior to the completion of the index motion of the crank arm 209. In order to effect completion of the index motion after any one or more of the heads H begins its downward movement in traverse which opens the corresponding switches 258 (Fig. 24, line 12), the cam 268 (Fig. 15) closes the index hold-over contact 273 (also Fig. 24, line 13) approximately 75° before the completion of the indexing movement of the arm 209.

Referring to Fig. 15, the cam 268 is set to close the traverse down switch 274 (Fig. 24, line 15) approximately 70° before the end of the indexing motion of the crank arm 209. Closing the switch 274 energizes the relay CR3 (line 15) as well as magnetic counter 334 (line 14). Energization of the relay CR3 causes the closing of the CR3 switch (line 19) thereby energizing the solenoid 322 (Fig. 23) causing the spool valve 318 to be moved to its upper position thereby causing the piston 312 (Fig. 16) to move rightwardly and to position the spool valve 304 in its rightward-most position. Accordingly, the lines 305 and 306 (Fig. 13) are open to the exhaust and line 303 is in communication with the lines 307 and 308. This causes liquid under pressure to flow through the passage 59 and to thereby effect upward movement of the draw bars 47 of the spindles S at the loading station L thereby opening the chucks of the spindles S to permit replacement of the finished work with unmachined work. Additionally, energization of the CR3 relay (line 15) closes the CR3 switch (line 20) thereby energizing the CR21 relay (line 20). Energization of the CR21 relay effects closing of the CR21 switch (line 21) in the circuit for the traverse down solenoid 335.

As the piston 312 (Fig. 16) moves rightwardly, the switch 321 (line 16) opens, thereby de-energizing the TR1 relay (line 16). Accordingly, TR1 switch (line 12) opens, but the index solenoid 321' remains energized if the index has not been completed by virtue of the switch 273 (line 13) having been closed by the cam 268.

As the head H moves downwardly in traverse, the drum 248 (Fig. 19) rotates in phase relation therewith. As the drum 248 continues to rotate, a dog 256 in the groove 253 closes the normally open switch 260 (line 22) thereby energizing the CR22 relay (line 22). Energization of the CR22 relay closes the normally open switch CR22 (line 23) thereby energizing the solenoid 341 (line 23).

Energization of the CR22 relay opens the normally closed switch CR22 (line 22) thereby de-energizing the CR21 relay (line 20). The de-energization of the CR21 relay opens the CR21 switch (line 21) thereby de-energizing the traverse down solenoid 335 (line 21). Referring to Fig. 20, de-energizing the solenoid 335 permits the constant pressure within the line 337 to move the spool 336 leftwardly, thereby closing line 337 to line 339 and exhausting line 339 through a line 345. Since line 339 is connected to line 187 by ducts 340, exhausting line 339 obviously exhausts line 187 (Figs. 20 and 9) so that the neutralizing pistons 179 and 180 disengage the traverse clutch 167 and stop down traverse.

Energization of the solenoid 341 (Fig. 20) causes the spool 342 associated therewith to move rightwardly, thereby causing the pressure liquid within the passage 337 to enter the passage 343 (Fig. 22) having a branch 343' (Fig. 20) that is connected to lines 127 and 161 (Figs. 20, 7 and 8). Accordingly, the pressure liquid flowing through the line 127 moves the piston 124 (Fig. 8) leftwardly thereby effecting engagement between the teeth 118 of clutch 117 and the teeth 114 of the gear 110 to thereby drive the gears 128 and 130 (Fig. 5). The pressure liquid in line 161 moves the clutch 141 downwardly (Fig. 6) or rightwardly (Fig. 7) in opposition to the constant pressure in the line 159 to cause clutch 141 to engage gear 142 and thereby rotate gear 143 (Fig. 6) together with screw 83 to provide a coarse feed rate of downward movement of head H.

As the screw 83 continues to rotate in a manner to feed the head H downwardly at the coarse rate, the drum 248 (Fig. 19), of course, continues to rotate in phase relation with the movement of the head. Accordingly, the dog 256 within the groove 254 of the drum 248 closes the fine feed switch 262 within the switch box 257' (Fig. 24, line 24). Closing of the switch 262 energizes the relay CR23 (line 24) thereby opening CR23 switch (line 24) and consequently de-energizing the CR22 relay (line 22) which opens CR22 switch (line 23) and de-energizes the coarse feed solenoid 341 (line 23). De-energization of the solenoid 341 (Fig. 20) causes the pressure within the line 337 to move the spool 342 leftwardly thereby cutting off the liquid under pressure within line 337 from the line 343 (Figs. 21 and 22), and opening passage 343 to the exhaust line 345. Exhausting the line 343 exhausts the lines 161 and 127 to thereby cause the constant pressure within the line 159 (Fig. 7) to disengage the clutch 141 from the gear 142 and thereby stop the downward movement of the head H at the coarse rate of feed. Energization of the relay CR23 (line 24) also closes the CR23 switch (line 25) thereby energizing the fine feed solenoid 346 (line 25). Referring to Fig. 20, energizing the solenoid 346 causes a spool 347 associated therewith to be moved rightwardly thereby permitting the liquid within the line 337 to pass into a line 348 (Figs. 21 and 22). The line 348 is provided with a branch 349 (Fig. 20) that is connected to line 126 and line 160 (Figs. 7 and 8). Admission of the liquid into line 126 forces the piston 124 (Fig. 8) rightwardly effecting the engagement between the teeth 116 of the clutch 115 with the teeth 113 of the gear 110, thereby causing the gears 129 and 131 to provide a relatively slow rate of rotation of the gear 137 (Fig. 5). Additionally, liquid under pressure within the line 160 (Fig. 7) forces the pistons 152 and 150 toward the right thereby causing the clutch 141 to engage the clutch teeth of the gear 142, whereupon the screw 83 (Fig. 6) is rotated at a relatively slow or fine feed rate to thereby move the head H downwardly accordingly.

As the head H moves downwardly at the fine rate of feed, of course, the drum 248 (Fig. 19) continues to rotate, until a dog 256 within the groove 255 thereof contacts the timer switch 264 (line 26). Closing of the switch 264 energizes the TR21 relay (line 26) which latter effects the opening of the TR21 switch (line 26) thereby de-energizing the CR23 solenoid (line 24). De-energization of the CR23 solenoid opens the CR23 switch (line 25) thereby de-energizing the fine feed solenoid 346 (line 25). Referring to Fig. 20, de-energization of the solenoid 346 causes the pressure within the line 337 to move the spool 347 leftwardly thereby cutting off the pressure liquid in line 337 from the passage 348 and opening the latter to the exhaust line 345. Exhausting the line 348 exhausts the lines 126 and 160 (Figs. 7 and 8) thereby effecting the disengagement of the fine feed clutch to thereby stop the downward feed movement of the head H.

Additionally, energization of the TR21 relay (Fig. 24, line 26) closes the normally open TR21 switch (line 27) thereby holding the TR21 relay energized. After a predetermined time interval the TR21 switch (line 29) is closed, thereby energizing CR24 relay (line 28) thereby closing the CR24 switch (line 29). Closing the CR24 switch energizes the traverse up solenoid 350. Referring to Fig. 20, energization of the solenoid 350 moves a spool 351 associated therewith rightwardly thereby connecting the pressure liquid within line 337 to the line 352 (Figs. 21 and 22) which line has a branch 353 that is connected to line 188 (Fig. 9) thereby forcing the piston 175 leftwardly and causing the clutch 167 to engage the clutch 170 thereby effecting the rotation of the screw 83 to move the head H upwardly at a rapid traverse rate.

As the head H moves upwardly at a rapid traverse rate, the drum 248, of course, continues to rotate and a dog 256 in the groove 252 finally contacts and opens the switch 259 (line 29). Opening of the normally closed switch 259 de-energizes the CR24 relay (line 28) thereby opening the CR24 switch (line 29) to deenergize the traverse-up solenoid 350 (line 29). Referring to Fig. 20, de-energization of the solenoid 350 causes the pressure liquid within passage 337 to move the spool 351 leftwardly, thereby cutting off the flow of liquid from passage 337 to the line 352 and opening line 352 to the exhaust passage 345. Exhausting the line 352 also exhausts the line 188 thereby causing the neutralizing pistons 179 and 180 (Fig. 9) to disengage the clutch 167 causing the head H to stop its upward movement at its uppermost position. When the head H reaches its uppermost position, it closes the corresponding switch 258 (line 12) by the dog 256 in the groove 252 of the drum 248 as previously described, pre-setting the circuit for the index solenoid 321' (line 12). Upon the closing of the switches 258 at all of the work stations, the circuit is then conditioned to effect the indexing of the carrier C to its next succeeding station.

While the above description refers to one of the heads H of the machine tool, the same cycle of operations of the other heads H is effected in an identical manner.

When it is desired manually to operate the heads H and index the carrier C, the manual automatic selector switch 354 (lines 8, 12 and 15) is moved to a vertical position thereby shunting out the switch 332 (line 9) and thereby rendering jog index switch 354' (line 11) effective. Accordingly, the index solenoid 321' (line 12) is then controlled by the push-button switch 354'. Additionally, the movement of the switch 354 to the manual position prevents the energization of the CR3 relay (line 15). Accordingly, CR3 switch (line 20) remains open and CR21 relay (line 20) remains de-energized. Accordingly, CR21 switch (line 20) remains open and the traverse down solenoid 335 (line 21) remains de-energized, so that the heads H do not traverse down at the end of the indexing of the carrier C when switch 274 (line 15) closes.

When it is desired manually to traverse the heads H downwardly, contacts 355 (line 6) and 356 (line 20) are closed while contact 357 (line 30) is open. Opening of the contact 357 prevents the energization of the traverse up solenoid 350 (line 29). Closing of the contact 356 (line 20) permits current to flow from L2 through the line including normally closed CR24 switch (line 26) thence through switch 356 (line 20) and the traverse down solenoid 335 (line 21) to L1. Energization of the traverse down solenoid 335 as previously described effects the downward traverse movement of the head H. Closing of the contact 355 (line 6) will energize the CR1 relay (line 8) in the event the pressure switches 328, 329 and 330 are closed. Energization of the CR1 relay causes closing of the CR1 switch (line 2) thereby energizing the solenoid relay 332 (line 2). Energization of the relay 332 effects the closing of the 332 switches (line 2) within the circuit for the main drive motor M thereby providing power for the machine tool.

If the contacts 355 (line 6) and 356 (line 20) are held closed, the head H will complete its traverse down motion, then complete its coarse and fine feed downward movements, at the end of the latter of which it will dwell and stop since the traverse up circuit has been opened by virtue of the contact 357 being opened.

Closing the up switches 358 and 358' (lines 27 and 6) will cause current to flow from line L2 through the LS21 switch (line 29) thence through the switch 358, the closed switch 357 to the CR24 relay (line 28), thence to the line L1 thereby energizing the CR24 relay. Energization of the CR24 relay closes the CR24 switch (line 29) thereby energizing the traverse up solenoid 350 causing the head H to move upwardly at a traverse rate. At the top of the traverse movement of the head H, the switch 259 (line 29) is opened to thereby de-energize the relay CR24 and the traverse up solenoid 350 (line 29).

Closing the jog index switch 354' (line 11) energizes the CR1 relay (line 8) in the event the pressure switches 328, 329 and 330 have been closed as previously explained. Energizing the CR1 relay, of course, closes the CR1 switch (line 20). Closing the treadle switch 325 (line 17) energizes the solenoid 317 to effect closing of the chuck at the loading station. It also effects the closing of switch 321 (line 16) thereby energizing the TR1 relay (line 16). Energization of the TR1 relay effects the time closing of the TR1 switch (line 12), and if all the heads H are in their uppermost positions so that the switches 258 at the stations 2, 3, 4, 5 and 6 are closed, then by closing the jog index switch 354' (line 11), the index solenoid 321' is energized and the carrier C is caused to be indexed to its next succeeding station. Releasing of the jog index button at any time during the index will cause it to stop, and upon depressing it again, the function is resumed.

When it is desired to insert the hand crank with the bevel gear 323 fixed to its one end (Fig. 6) at any station, safety switch 359 (Fig. 24, line 29) is opened, thereby neutralizing the circuit for the head H at the station where the hand crank is inserted.

The chuck at the loading station L can be opened by stepping on the chuck treadle operating the switch 325' (line 18) thereby energizing the solenoid 322 to effect opening of the chuck at the loading station. Simply by moving the spool 304 rightwardly by manual means at any of the other stations will cause the chuck at that station to open.

When it is desired to employ coolant during the working operations, a manually-operable switch 360 (line 6) is closed thereby energizing a relay 361 (line 6) which energization closes the 361 switches (line 2) of a coolant pump motor 362 (line 5).

Certain safety devices are employed within the electrical circuit for the machine tool. Push-button switches 363, 364, 365 and 365' (lines 4, 6, 7 and 8) are conveniently located about the frame of the machine tool so that an operator can stop the main drive motor M (line 5) at will from any point about the machine tool. Limit switches LS1 (line 15) and LS2 (line 16) are arranged to be opened upon the opening of the door of the housing at each work station within which the electrical controls for that station are housed.

A brake associated with the main drive motor M (line 5) is held released by the energization of a relay 366 (line 7). Upon de-energization of the CR1 relay (line 8), relay 366 also becomes de-energized applying the brake to the motor M.

The switch 261 (Fig. 19 and Fig. 24, line 21) is a safety switch that opens in the event of the failure of switch 260 (line 22) to close as the drum 248 (Fig. 21) overrides. Additionally, switch 263 (Fig. 19 and Fig. 24, line 23) is adapted to open upon override of drum 248 in the event switch 262 (line 24) fails to close or relay CR23 (line 24) fails to become energized.

Finally, each working station of the machine tool includes a switch 367 (line 29) that can be opened to neutralize the operation of the head H at that station.

Although the various features of the new and improved machine tool have been shown and described in detail to fully disclose one embodiment of the invention, it will be evident that numerous changes may be made in such details, and certain features may be used without others without departing from the principles of the invention.

What is claimed is:

1. In a synchronizing mechanism for a multiple spindle machine tool, a bracket stationarily mounted within the base of said machine tool; a first hollow cylindrical member journaled within said bracket and having a gear fixed thereto; a second hollow cylindrical member telescopically received within said first member and provided with a friction clutch engaging surface; a third hollow cylindrical member telescopically received within said second member and provided with a positive enmeshing clutch engaging element; a piston fixed to said stationary bracket and extending into said third hollow cylindrical member; a compression spring located between said second and third members; means for selectively admitting liquid under pressure to opposite sides of the piston within said third member; and means for rotating the gear fixed to said first member.

2. In a synchronizing mechanism for a multiple spindle machine tool, a bracket stationarily mounted within the base of said machine tool; a first hollow cylindrical member journaled within said bracket, and having a gear fixed thereto; a second hollow cylindrical member telescopically received within said first member and provided with a friction clutch engaging surface; a third hollow cylindrical member telescopically received within said second member and provided with a positive enmeshing clutch-engaging element; a piston fixed to said stationary bracket and extending into said third hollow cylindrical member; a compression spring located between said second and third members; means for selectively admitting liquid under pressure to opposite sides of the piston within said third member, means for restricting the rate of movement of said third cylindrical member under the action of said hydraulic means; and means for rotating the gear fixed to said first member.

3. In a synchronizing mechanism for a multiple spindle machine tool, a bracket stationarily mounted within the base of said machine tool; a first hollow cylindrical member journaled within said bracket, and having a gear fixed thereto; a second hollow cylindrical member telescopically received within said first member and provided with a friction clutch-engaging surface; a third hollow cylindrical member telescopically received within said second member and provided with a positive enmeshing clutch-engaging element; a piston fixed to said stationary bracket and extending into said third hollow cylindrical member; a compression spring located between said second and third members; means for selectively admitting liquid under pressure to opposite sides of the piston within said third member; a drive shaft journaled in said stationary bracket; and a gear fixed to said drive shaft and meshing with the gear fixed to said first member.

4. In a synchronizing mechanism, a first hollow cylindrical member journaled within a stationary bracket and having a gear fixed thereto; a second hollow cylindrical member telescopically received within said first member and provided with a friction clutch-engaging surface; a third hollow cylindrical member telescopically received within said second member and provided with a positive enmeshing clutch engaging element; a piston fixed to said stationary bracket and extending into said third hollow cylindrical member; a compression spring located between said second and third members; means for admitting liquid under pressure between the top of said piston member and the one end of said third cylindrical member for causing said second and third cylindrical members to move upwardly; and means for exhausting the space within said third cylindrical member below the top of said piston, said exhausting means including a restrictive means whereby the rate of movement of said third cylindrical member and its associated positive clutch engaging element is restricted during its upward movement.

5. Apparatus comprising in combination, a member adapted to be rotated at a synchronous speed relatively to a continuously rotating driving mechanism; a friction driving surface integral with said member; a positive enmeshing driving element concentric with, and integral with said member; a second friction driving surface constantly rotated by said continuously rotating driving mechanism; a second positive enmeshing driving element concentric with, and constantly rotated by said continuously rotating driving mechanism; and means for successively effecting engagement between said friction driving surfaces and said positive enmeshing elements such that both said friction surfaces and positive enmeshing elements remain in driving engagement during the rotation of said member.

6. Apparatus comprising in combination, a member adapted to be rotated at a synchronous speed relatively to a continously rotating driving mechanism; a friction driving surface integral with said member; a positive enmeshing driving element concentric with, and integral with said member; a second friction driving surface constantly rotated by said continuously rotating driving mechanism; a second positive enmeshing driving element concentric with, and constantly rotated by said continuously rotating driving mechanism, said positive enmeshing driving elements being adapted to provide substantial backlash when in driving engagement; and means for successively effecting engagement between said friction driving surfaces and said positive enmeshing elements such that both said friction surfaces and positive enmeshing elements remain in driving engagement during the rotation of said member.

7. Hydraulic chuck operator means for each work-supporting spindle of a multiple spindle lathe in which a plurality of work-supporting spindles and chucks therefor are mounted on a carrier that is indexed from station to station about a central stationary column, comprising chuck-operating means including valve means for each chuck; transfer means for each of said valve means, one element of said transfer means being located in said carrier and in communication with its corresponding valve means, and another element of said transfer means being stationarily mounted within said column and adapted to cooperate with the element of said transfer means within said carrier; and valve-operating means at said loading station adapted successively to register with each valve means of each chuck-operating means as said carrier is indexed from station to station.

8. Hydraulic chuck operator means for each work-supporting spindle of a multiple spindle lathe in which a plurality of work-supporting spindles and chucks therefor are mounted on a carrier that is indexed from station to station about a central stationary column, comprising chuck-operating means including valve means for each spindle on said carrier; stationary means within said column at each station for supplying liquid under pressure to said valve means within said carrier; and means within said carrier adapted to cooperate with said stationary means within said column at each index position of said carrier for providing a pressure seal oil transfer means from within said column to said valve means.

9. Hydraulic chuck operator means for each work-supporting spindle of a multiple spindle lathe in which a plurality of work-supporting spindles and chucks therefor are mounted on a carrier that is indexed from station to station about a central stationary column, comprising chuck-operating means including valve means for each spindle in said carrier; stationary oil transfer means located within said column at each of said stations; means within said carrier adapted to cooperate with said stationary oil transfer means within said column when said carrier is at each of its indexed stations about said column; means for supplying liquid under pressure from said stationary oil transfer means within said column to said valve means within said carrier while said carrier is being indexed from station to station; and means for providing a pressure seal between said stationary oil transfer means within said column and the means within said carrier adapted to cooperate therewith when said carrier is at each of its indexed stations about said column.

10. Hydraulic chuck operator means for each work-supporting spindle of a multiple spindle lathe in which a plurality of work-supporting spindles and chucks therefor are mounted on a carrier that is indexed from station to station about a central stationary column, comprising chuck-operating means including valve means for each spindle on said carrier; stationary oil transfer means located within said column at each station about said column; means within said carrier for each chuck-operating valve means; a piston element associated with each oil transfer means and adapted to cooperate with the means within said carrier for each of said valve means; means for supplying liquid under pressure through said piston means; and means for admitting liquid under pressure to the one end of said piston means when said carrier is at each of its indexed stations, whereby a pressure seal is effected between said piston means and the means within said carrier for each valve means.

11. Hydraulic chuck operator means for each work-supporting spindle of a multiple spindle lathe in which a plurality of work-supporting spindles and chucks therefor are mounted on a carrier that is indexed from station to station about a central stationary column, comprising chuck-operating means including valve means for each spindle on said carrier; stationary means within said column at each station for supplying liquid under pressure to said valve means within said carrier; means within said carrier adapted to cooperate with said stationary means within said column at each indexed position of said carrier for providing a pressure seal oil transfer means from within said column to said valve means; and means responsive to said indexing means for rendering said pressure seal effective.

12. Hydraulic chuck operator means for each work-supporting spindle of a multiple spindle lathe in which a plurality of work-supporting spindles and chucks therefor are mounted on a carrier that is indexed from station to station about a central stationary column, comprising chuck-operating means including valve means for each spindle on said carrier; stationary transfer means located at each station about said column within said column, said transfer means including a piston element adapted to cooperate with means within said carrier corresponding to each valve means; means for supplying liquid under pressure through said piston means within said transfer means; means for admitting liquid under pressure to the one end of said piston means when said carrier is at each of its indexed stations; valve means for controlling the admission of liquid under pressure to the one end of said piston means; and means responsive to the indexing of said carrier for operating said last-mentioned valve means in timed relation with the indexing of said carrier.

13. Hydraulic chuck operator means for each work-supporting spindle of a multiple spindle lathe in which a plurality of work-supporting spindles and chucks therefor are mounted on a carrier that is indexed from station to station about a central stationary column, comprising chuck-operating means including valve means for each spindle on said carrier; stationary transfer means within said column and located at each station about said column for supplying liquid under pressure to said valve means within said carrier; means within said carrier for each spindle adapted to cooperate with said stationary transfer means for providing a pressure seal oil transfer means from within said column to said valve means; a tool-supporting head at each of said work stations; means for moving said tool-supporting head downwardly toward said spindle to perform working operations on work held on said spindle; means for moving said tool-supporting heads upwardly to a starting position after the completion of a work-performing operation by each head; an electrical circuit for rendering effective said indexing means; an electrical switch for each of said tool-supporting heads arranged in series relation with respect to each other for rendering effective said indexing means; means on each tool-supporting head for operating its corresponding electrical switch when it has reached its upper starting position; and means responsive to the indexing of said carrier for rendering effective said pressure seal between the stationary transfer means within said column and the cooperating means within said carrier.

14. Hydraulic chuck operator means for each work-supporting spindle of a multiple spindle lathe in which a plurality of work-supporting spindles and chucks therefor are mounted on a carrier that is indexed from station to station about a central stationary column, comprising chuck-operating means including valve means for each spindle on said carrier; stationary means within said column at each station for supplying liquid under pressure to said valve means within said carrier; means within said carrier adapted to cooperate with said stationary means within said column at each index position of said carrier for providing a pressure seal oil transfer means from within said column to said valve means; means responsive to said indexing means for rendering effective said pressure seal; and valve-operating means at said loading station adapted successively to register with each valve means of said chuck-operating means as said carrier is indexed from station to station.

References Cited in the file of this patent

UNITED STATES PATENTS

| | | |
|---|---|---|
| 1,690,567 | Bullard | Nov. 6, 1928 |
| 2,031,051 | Lewis | Feb. 18, 1936 |
| 2,086,837 | Appelberg | July 13, 1937 |
| 2,086,845 | Bullard | July 13, 1937 |
| 2,086,847 | Bullard | July 13, 1937 |
| 2,086,852 | Bullard | July 13, 1937 |
| 2,357,396 | Fuller | Sept. 5, 1944 |
| 2,429,938 | Mansfield | Oct. 18, 1947 |
| 2,451,723 | Eagle | Oct. 19, 1948 |
| 2,464,156 | Sandersen | Mar. 8, 1949 |
| 2,466,574 | Bullard | Apr. 5, 1949 |
| 2,540,186 | Bullard | Feb. 9, 1951 |
| 2,545,053 | Siekmann | Mar. 13, 1951 |
| 2,571,289 | Potter | Oct. 16, 1951 |
| 2,661,632 | Lammerz | Dec. 8, 1953 |
| 2,774,250 | Gallimore | Dec. 18, 1956 |